(12) United States Patent
Ellis et al.

(10) Patent No.: US 11,103,880 B2
(45) Date of Patent: *Aug. 31, 2021

(54) MAGNETIC SEPARATION OF ELECTROCHEMICAL CELL MATERIALS

(71) Applicant: RSR TECHNOLOGIES, INC., Dallas, TX (US)

(72) Inventors: Timothy W. Ellis, Dallas, TX (US); Joshua A. Montenegro, Dallas, TX (US)

(73) Assignee: RSR TECHNOLOGIES, INC., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/102,247

(22) Filed: Aug. 13, 2018

(65) Prior Publication Data

US 2019/0039075 A1 Feb. 7, 2019

Related U.S. Application Data

(63) Continuation of application No. 14/879,238, filed on Oct. 9, 2015, now Pat. No. 10,046,334, which is a
(Continued)

(51) Int. Cl.
*B03C 1/28* (2006.01)
*B07B 1/46* (2006.01)
(Continued)

(52) U.S. Cl.
CPC ............. *B03C 1/286* (2013.01); *B03C 1/032* (2013.01); *B03C 1/034* (2013.01); *B03C 1/0335* (2013.01); *B03C 1/32* (2013.01); *B07B 1/46* (2013.01); *H01M 10/54* (2013.01); *B03C 2201/18* (2013.01); *B07B 1/4609* (2013.01); *B07B 1/4645* (2013.01); *Y02W 30/84* (2015.05)

(58) Field of Classification Search
CPC .. B03C 1/23; B03C 1/286; B03C 1/30; B03C 1/14; B03C 1/035; B03C 1/22; B03C 1/247; H01M 10/54; B07B 1/18; B07B 1/22
See application file for complete search history.

(56) References Cited

U.S. PATENT DOCUMENTS 2,814,386 A 11/1957 Palm
2,954,122 A 9/1960 Colburn
(Continued)

FOREIGN PATENT DOCUMENTS

CN 101242016 A 8/2008
CN 101673829 A 3/2010
(Continued)

OTHER PUBLICATIONS

Stevenson, M., "Recycling: Lead-Acid Batteries: Overview," Encyclopedia of Electrochemical Power Sources, pp. 165-178, 2009, Elsevier B.V., Editor-in-Chief: Jürgen Garche.
(Continued)

*Primary Examiner* — Charles A Fox
*Assistant Examiner* — Kalyanavenkateshware Kumar
(74) *Attorney, Agent, or Firm* — Baker Botts, LLP

(57) ABSTRACT

A process. The process includes forming a slurry comprising electrode active material particles of one or more lithium-ion electrochemical cells, magnetizing the electrode active material particles and separating the magnetized electrode active material particles from the slurry.

20 Claims, 30 Drawing Sheets

Related U.S. Application Data continuation of application No. 13/435,143, filed on Mar. 30, 2012, now Pat. No. 9,156,038.

(51) Int. Cl.

| | | |
|---|---|---|
| *B03C 1/032* | (2006.01) | |
| *B03C 1/033* | (2006.01) | |
| *B03C 1/034* | (2006.01) | |
| *B03C 1/32* | (2006.01) | |
| *H01M 10/54* | (2006.01) | |

(56) References Cited

U.S. PATENT DOCUMENTS

| | | |
|---|---|---|
| 3,294,237 A | 12/1966 | Weston |
| 3,372,803 A | 3/1968 | De Lisle et al. |
| 3,448,857 A | 6/1969 | Benson et al. |
| 3,811,962 A | 5/1974 | Benz |
| 3,838,773 A | 10/1974 | Kolm |
| 4,106,627 A | 8/1978 | Watanabe |
| 4,214,984 A | 7/1980 | MacElvain |
| 4,512,879 A | 4/1985 | Attia et al. |
| 4,737,294 A | 4/1988 | Kukuck |
| 4,906,382 A | 3/1990 | Hwang |
| 5,394,991 A | 3/1995 | Kumagai |
| 6,006,920 A | 12/1999 | Bilimoria et al. |
| 6,045,705 A | 4/2000 | Watson et al. |
| 6,143,042 A | 11/2000 | Rogers |
| 6,180,278 B1 | 1/2001 | Prickett et al. |
| 6,261,712 B1 | 7/2001 | Hayashi et al. |
| 7,198,865 B2 | 4/2007 | Sloop |
| 7,858,216 B2 | 12/2010 | Sloop |
| 7,886,913 B1 | 2/2011 | Fritz et al. |
| 8,052,875 B2 | 11/2011 | Oder et al. |
| 8,067,107 B2 | 11/2011 | Sloop et al. |
| 8,246,717 B1 | 8/2012 | Smith et al. |
| 8,696,785 B2 | 4/2014 | Iida |
| 8,714,361 B2 | 5/2014 | Ellis |
| 8,728,343 B2 | 5/2014 | Kagei et al. |
| 9,156,038 B2 | 10/2015 | Ellis et al. |
| 10,046,334 B2 | 8/2018 | Ellis et al. |
| 2002/0124691 A1 | 9/2002 | Tateiwa et al. |
| 2008/0302732 A1 | 12/2008 | Soh et al. |
| 2009/0201353 A1 | 8/2009 | Tonami et al. |
| 2009/0286137 A1 | 11/2009 | Sloop |
| 2011/0147679 A1 | 6/2011 | Inukai et al. |

FOREIGN PATENT DOCUMENTS

| | | |
|---|---|---|
| CN | 102534223 A | 7/2012 |
| DE | 2059166 A1 | 6/1972 |
| EP | 2128279 A1 | 12/2009 |
| GB | 1415918 A | 12/1975 |
| JP | S56-97560 A | 8/1981 |
| JP | H10-296227 A | 11/1998 |
| JP | H11-167936 | 6/1999 |
| JP | 2007-536072 A | 12/2007 |
| JP | 2010-34021 A | 2/2010 |
| JP | 2010-277987 A | 12/2010 |
| JP | 2011-124127 A | 6/2011 |
| WO | WO 2008/022415 A1 | 2/2008 |
| WO | WO 2010/045177 A2 | 4/2010 |

OTHER PUBLICATIONS

Sloop et al., "Recycling: Lead-Acid Batteries: Electrochemical," Encyclopedia of Electrochemical Power Sources, pp. 179-187, 2009, Elsevier B.V., Editor-in-Chief: Jürgen Garche.

Kolaich et al., "Recycling: Lithium and Nickel-Metal Hydride Batteries," Encyclopedia of Electrochemical Power Sources, pp. 188-198, 2009, Elsevier B.V., Editor-in-Chief: Jürgen Garche.

Scott, K., "Recycling: Nickel-Metal Hydride Batteries," Encyclopedia of Electrochemical Power Sources, pp. 199-208, 2009, Elsevier B.V., Editor-in-Chief: Jürgen Garche.

Xu et al., "A review of processes and technologies for the recycling of lithium-ion secondary batteries," Journal of Power Sources, vol. 177, Jan. 2008, pp. 512-527.

Shin et al., "Development of a metal recovery process from Li-ion battery wastes," Hydrometallurgy, vol. 79, Issues 3-4, Oct. 2005, pp. 172-181.

Julien et al., "Magnetic properties of lithium intercalation compounds," Ionics, vol. 12, No. 1, 2006, pp. 21-32.

Nan et al., "Recovery of metal values from spent lithium-ion batteries with chemical deposition and solvent extraction," Journal of Power Sources, vol. 152, Dec. 1, 2005, pp. 278-284.

Wang et al., "A novel recovery process of metal values from the cathode active materials of the lithium-ion secondary batteries," Hydrometallurgy, vol. 99, Issues 3-4, Nov. 2009, pp. 194-201.

Pranolo et al., "Recovery of metals from spent lithium-ion battery leach solutions with a mixed solvent extractant system," Hydrometallurgy, vol. 102, issues 1-4, Apr. 2010, pp. 37-42.

Xin et al., "Bioleaching mechanism of Co and Li from spent lithium-ion battery by the mixed culture of acidophilic sulfur-oxidizing and iron-oxidizing bacteria," Bioresource Technology, vol. 100, Issue 24, Dec. 2009, pp. 6163-6169.

Li et al., "Recovery of cobalt and lithium from spent lithium ion batteries using organic citric acid as leachant," J. Hazard Mater., 176(1-3), Apr. 15, 2010, pp. 288-293.

Contestabile et al., "A laboratory-scale lithium-ion battery recycling process," Journal of Power Sources, vol. 92, Issues 1-2, Jan. 2001, pp. 65-69.

Bertuola et al., "Spent NiMH batteries: Characterization and metal recovery through mechanical processing," Journal of Power Sources, vol. 160, issue 2, Oct. 6, 2006, pp. 1465-1470.

Murariu et al., "The Applicability of Davis Tube Tests to Ore Separation by Drum Magnetic Separators," Physical Separation in Science and Engineering. vol. 12, Issue 1, 2003, pp. 1-11.

Kim et al., "Recovery of LiCoO2 from Wasted Lithium Ion Batteries by using Mineral Processing Technology," Resources Processing, vol. 51, Issue 1, 2004, pp. 3-7.

Magnetic Susceptibility of the Elements and Inorganic Compounds, 4-130:4-135, publication date unknown.

Eriez. High Intensity Wet Magnetic Separator, Series L, Model 4, Laboratory Separator, technical data sheet, 2007.

Eriez, WHIMS Series Laboratory Separator, Models L-4 arid L-4-20, Installation, Operation and Maintenance Instructions. 1997.

Eriez, High-Intensity Magnetic Filter, Matrix Models for Wet Applications, 2011.

Eriez, Wet Drum Separators. Heavy Media and Concentration Models, 2005.

MAGNETIC SEPARATION OF ELECTROCHEMICAL CELL MATERIALS

CROSS-REFERENCE TO RELATED APPLICATIONS

This patent application claims priority under 35 U.S.C. § 120 as a continuation of co-pending U.S. patent application Ser. No. 14/879,238, which has a filing date of Oct. 9, 2015, which is a continuation application and claims priority under 35 U.S.C. § 120 as a continuation of U.S. patent application Ser. No. 13/435,143, filed on Mar. 30, 2012, which issued on Oct. 13, 2015 as U.S. Pat. No. 9,156,038. U.S. patent application Ser. Nos. 14/879,238 and 13/435,143 are incorporated by reference into this specification.

TECHNICAL FIELD

This specification generally relates to the separation of recyclable electrode materials from electrochemical cell scrap. More specifically, this specification relates to the separation of recyclable electrode materials from electrochemical cell scrap to form recycled material concentrates that may be directly re-used in new electrochemical cell manufacturing.

BACKGROUND

Batteries and other devices comprising electrochemical cells are an ever-present part of modern consumer and industrial technology. For example, lithium-ion, nickel-metal hydride, nickel-zinc, nickel-cadmium, and lead-acid rechargeable batteries (i.e., secondary batteries) are used in applications including, but not limited to, gasoline-powered automobiles, hybrid electric vehicles, electric vehicles, industrial equipment, power tools, and consumer electronics (e.g., notebook computers, tablet computers, cellular telephones and smart phones, among other rechargeable electronic devices). In addition, single-use disposable batteries (i.e., primary batteries such as, for example, zinc-carbon batteries and alkaline batteries) are used in a vast number of electrical and electronic device applications. Accordingly, the widespread use of batteries and other devices comprising electrochemical cells (e.g., electric double-layer capacitors, also known as supercapacitors or ultracapacitors) causes the generation of large scrap battery waste streams.

As the use of batteries and other electrochemical cells becomes more widespread resulting in larger scrap device waste streams, the recycling of scrap devices becomes increasingly important from the perspective of both environmental sustainability and manufacturing economics. Because batteries and other electrochemical cell devices may comprise scarce materials and various chemicals posing environmental contamination concerns, the recycling of scrap devices is important to advance goals of environmental protection and sustainability. Moreover, because batteries and other electrochemical cell devices may comprise relatively expensive materials such as nickel, cobalt, lithium metal compounds, and other expensive metals, alloys, and compounds, the recycling of scrap devices is important for reducing the costs of manufacturing new batteries and electrochemical cells, which would otherwise require the use of virgin materials.

SUMMARY

In a non-limiting embodiment, a process for the separation of materials from electrochemical cells is described. The process comprises subjecting a slurry comprising electrode active material particles to a magnetic field. The magnetic field is of sufficient magnetic field intensity to magnetize paramagnetic particles in the slurry. The magnetized particles are separated from the slurry using magnetic force induced between the magnetized particles and an active magnetic surface in contact with the slurry.

In another non-limiting embodiment, a process for the separation of materials from electrochemical cells comprises removing electrode active materials from electrochemical cells. The electrochemical cells comprise lithium ion electrochemical cells. A slurry is formed comprising the electrode active materials. The slurry comprises lithium metal compounds. The slurry is subjected to a magnetic field of sufficient magnetic field intensity to magnetize particles in the slurry. The magnetized particles comprise at least one lithium metal compound. The magnetized particles are separated from the slurry using magnetic force induced between the magnetized particles and an active magnetic surface in contact with the slurry.

In another non-limiting embodiment, a process for the separation of materials from electrochemical cells comprises comminuting electrochemical cells. The electrochemical cells comprise lithium-ion electrochemical cells. The comminuted electrochemical cells are screened to separate electrode active material particles from other electrochemical cell components. The electrode active material particles comprise two or more lithium metal compounds. The electrode active material particles are mixed with a carrier fluid to produce a slurry. The slurry is subjected to a magnetic field of sufficient magnetic field intensity to magnetize paramagnetic particles in the slurry. The magnetized particles are separated from the slurry using magnetic force induced between the magnetized particles and an active magnetic surface in contact with the slurry. The separated particles comprise one of the two or more lithium metal compounds. The two or more lithium metal compounds are collected as separated electrode active material concentrates.

It is understood that the invention disclosed and described in this specification is not limited to the embodiments summarized in this Summary.

BRIEF DESCRIPTION OF THE DRAWINGS

Various features and characteristics of the non-limiting and non-exhaustive embodiments disclosed and described in this specification may be better understood by reference to the accompanying figures, in which.

Figure 1:
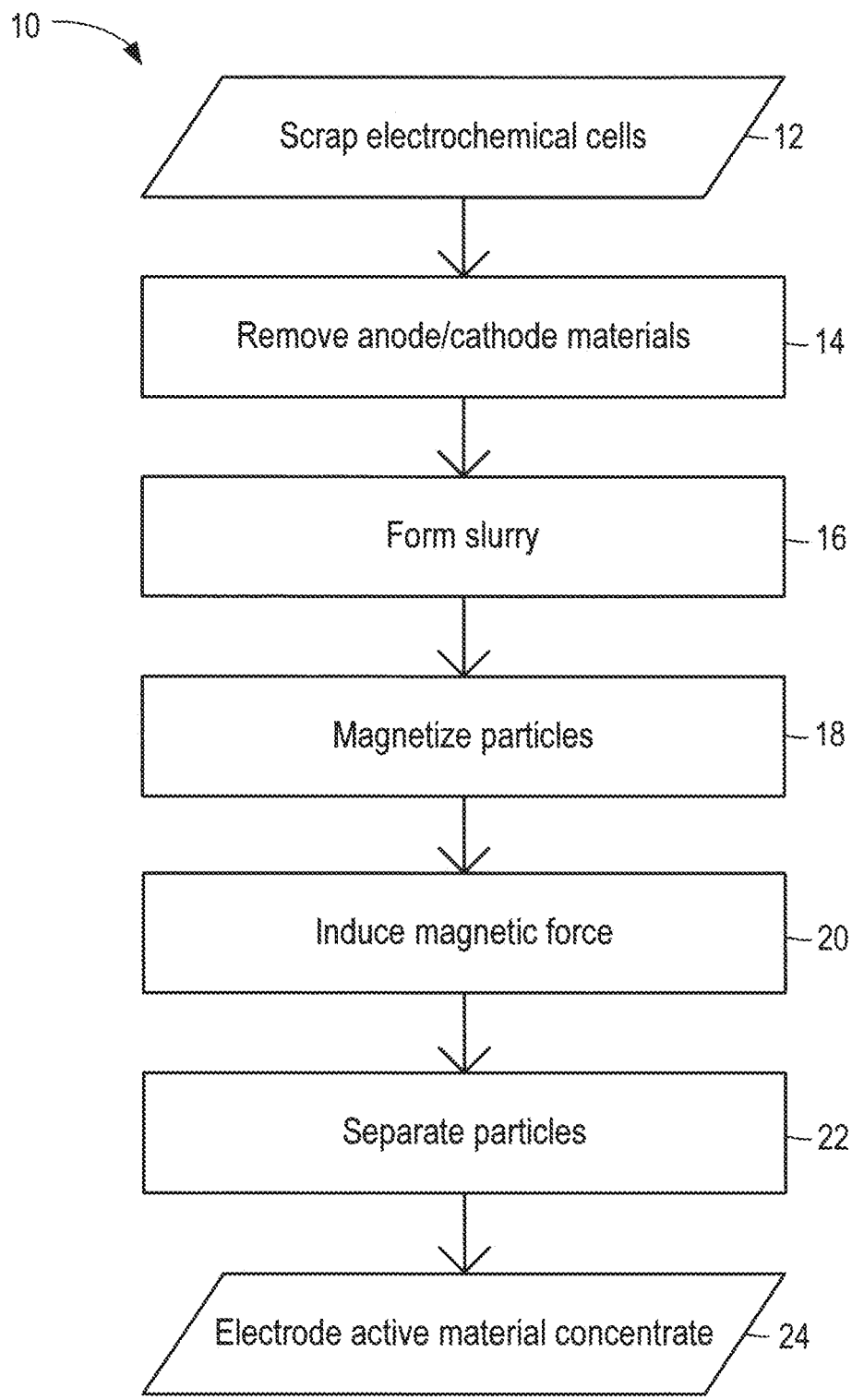
FIG. 1 is a flowchart diagram illustrating a process for the separation and concentration of electrode active materials from electrochemical cells.

The reader will appreciate the foregoing details, as well as others, upon considering the following detailed description of various non-limiting and non-exhaustive embodiments according to this specification.

DESCRIPTION

Various embodiments are described and illustrated in this specification to provide an overall understanding of the structure, function, properties, and use of the disclosed processes and systems. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112, first paragraph, and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserve the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in this specification should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserve the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112, first paragraph, and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

At present, the most commercially significant secondary battery systems are lead-acid, nickel-cadmium, nickel-metal hydride, and lithium-ion. An overview of the recycling of these battery systems is described in the following references, each of which is incorporated by reference into this specification:

Stevenson, M., "Recycling: Lead-Acid Batteries: Overview," *Encyclopedia of Electrochemical Power Sources*, pp. 165-178, 2009, Elsevier B. V., Editor-in-Chief: Jürgen Garche.

Sloop, S. E., Kotaich, K., Ellis, T. W., & Clarke, R., "Recycling: Lead-Acid Batteries: Electrochemical," *Encyclopedia of Electrochemical Power Sources*, pp. 179-187, 2009, Elsevier B. V., Editor-in-Chief: Jürgen Garche.

Kotaich, K. & Sloop, S. E., "Recycling: Lithium and Nickel-Metal Hydride Batteries," *Encyclopedia of Electrochemical Power Sources*, pp. 188-198, 2009, Elsevier B. V., Editor-in-Chief: Jürgen Garche.

Scott, K., "Recycling: Nickel-Metal Hydride Batteries," *Encyclopedia of Electrochemical Power Sources*, pp. 199-208, 2009, Elsevier B. V., Editor-in-Chief: Jürgen Garche.

Xu, J., Thomas H. R., Francis R. W., Lum, K. R., Wang, J., Liang, B., "A review of processes and technologies for the recycling of lithium-ion secondary batteries," *Journal of Power Sources*, Volume 177, January 2008, pp. 512-527.

S. M. Shin, N. H. Kim, J. S. Sohn, D. H. Yang, Y. H. Kim, "Development of a metal recovery process from Li-ion battery wastes," *Hydrometallurgy*, Volume 79, Issues 3-4, October 2005, pp. 172-181.

Junmin Nan, Dongmei Han, Xiaoxi Zuo, "Recovery of metal values from spent lithium-ion batteries with chemical deposition and solvent extraction," *Journal of Power Sources*, Volume 152, 1 Dec. 2005, Pages 278-284.

Rong-Chi Wanga, Yu-Chuan Lina, She-Huang Wub, "A novel recovery process of metal values from the cathode active materials of the lithium-ion secondary batteries," Hydrometallurgy, Volume 99, Issues 3-4, November 2009, Pages 194-201.

Y. Pranolo, W. Zhang, C. Y. Cheng, "Recovery of metals from spent lithium-ion battery leach solutions with a mixed solvent extractant system," *Hydrometallurgy*, Volume 102, Issues 1-4, April 2010, Pages 37-42.

Baoping Xin, Di Zhang, Xian Zhang, Yunting Xia, Feng Wu, Shi Chen, Li Li, "Bioleaching mechanism of Co and Li from spent lithium-ion battery by the mixed culture of acidophilic sulfur-oxidizing and iron-oxidizing bacteria," *Bioresource Technology*, Volume 100, Issue 24, December 2009, Pages 6163-6169.

Li L, Ge J, Wu F, Chen R, Chen S, Wu B, "Recovery of cobalt and lithium from spent lithium ion batteries using organic citric acid as leachant," *J. Hazard Mater.*, 176(1-3), Apr. 15, 2010, pp. 288-93.

M Contestabile, S Panero, B Scrosati, "A laboratory-scale lithium-ion battery recycling process," *Journal of Power Sources*, Volume 92, Issues 1-2, January 2001, Pages 65-69.

Daniel Assumpção Bertuola, Andréa Moura Bernardesa, Jorge Alberto Soares Tenóriob, "Spent NiMH batteries: Characterization and metal recovery through mechanical processing," *Journal of Power Sources*, Volume 160, Issue 2, 6 Oct. 2006, Pages 1465-1470.

Kim, Y, Matsuda, M., Shibayama, A., Fujita, T., "Recovery of $LiCoO_2$ from Wasted Lithium Ion Batteries by using Mineral Processing Technology," *Resources Processing*, Volume 51, Issue 1, 2004, pp. 3-7.

U.S. Pat. No. 6,261,712, Jul. 17, 2001.

International Patent Application Publication No. WO 2008/022415 A1, Feb. 28, 2008.

Industrial-scale processes for the reclamation and recycling of active electrochemical cell materials (i.e., the electrode active materials) generally fall into two categories: pyrometallurgical processes and hydrometallurgical processes. Pyrometallurgical processes involve the high-temperature smelting of scrap electrochemical cells to produce various alloys, metallic oxides, carbon, and flue gases. Pyrometallurgical processes are very energy-intensive and produce large quantities of slag, dross, fly ash, and other waste materials that must be disposed of or further processed. Hydrometallurgical processes generally employ aggressive chemicals such as strong acids and/or strong bases to dissolve metals, alloys, and/or inorganic metal compounds, such as metal oxides, and extract or leach the active electrochemical cell materials from scrap electrochemical cells. To recover the extracted/leached materials, the ion-rich leach solutions that result from extraction treatment must be further processed by techniques such as counter-solvent extraction, chemical precipitation, chemical deposition, and/or electrowinning to recover the dissolved metals in a chemically reduced or other useful form. Hydrometallurgical processes rely on inorganic solution chemistry and solution post-processing and, therefore, may pose environmental or workplace health and safety concerns arising from solution waste streams.

Pyrometallurgical and hydrometallurgical processes both suffer from various additional disadvantages, particularly in the context of recycling electrode materials from lithium-ion batteries. In both types of recycling processes, the electrode active materials are recovered in structurally-modified and chemically-modified forms that cannot be directly re-used to manufacture electrodes for new electrochemical cells. For example, during pyrometallurgical recycling of lithium-ion batteries, the cathode (i.e., positive electrode) active materials (e.g., $LiCoO_2$, $LiMn_2O_4$, $LiFePO_4$, $LiNiO_2$, $LiNiCoMnO_2$, $LiNi_{1/3}Co_{1/3}Al_{1/3}O_2$, $LiNi_{0.8}Co_{0.2}O_2$, $LiNiO_{0.833}Co_{0.17}O_2$) are chemically converted into Co—Fe—Ni—Mn alloys, which are recovered as the smelting product, and lithium oxides, which are lost to slag, fly ash, and dross. Likewise, during hydrometallurgical recycling of lithium-ion batteries, the cathode active materials are chemically converted into various oxides, hydroxides, and oxyhydroxides of the constituent metals, which must undergo substantial post-processing, separation, purification, and chemical modification and synthesis to reconstitute cathode active materials. Analogous issues are associated with the pyrometallurgical and hydrometallurgical recycling of electrode active materials from nickel-metal hydride, lead-acid, and other electrochemical cell chemistries.

Pyrometallurgical and hydrometallurgical recycling processes both fail to recover the electrode active materials in the structural and chemical forms present in the original electrochemical cells. The processes and systems described in this specification address this issue, among others, by enabling the separation of recyclable anode and cathode active materials from electrochemical cell scrap in the structural and chemical forms present in the original electrochemical cells. The processes and systems described in this specification may form recycled material concentrates that may be directly re-used in new electrochemical cell manufacturing. In this manner, the processes and systems described in this specification may eliminate the need for pyrometallurgical and hydrometallurgical recycling processes to recover electrode active materials from scrap electrochemical cells. Alternatively, in various non-limiting embodiments, the processes and systems described in this specification may be used in combination with pyrometallurgical, hydrometallurgical, and other recycling processes and systems.

The embodiments described in this specification comprise the magnetic separation of magnetized particles comprising electrode active materials from scrap electrochemical cells. It is understood that scrap electrochemical cells include, but are not limited to, end-of-life, damaged, or otherwise scrapped batteries and other devices comprising energy storing and/or converting electrochemical cells, such as, for example, electric double-layer capacitors.

When a material is placed in a magnetic field, a magnetization (i.e., a net magnetic dipole moment per unit volume) is induced in the material. The magnetization (M) of a material placed in a magnetic field (H) is defined by the expression:

$$M=\chi H$$

wherein $\chi$ is the magnetic susceptibility of the material. Magnetic susceptibility is a dimensionless proportionality constant that indicates the degree of magnetization of a material in response to an externally applied magnetic field. The magnetic susceptibility of a material is an intrinsic physical property. The magnetic susceptibility of a material provides a measure of how the material will react when placed in a magnetic field.

All atomic, ionic, and molecular matter possesses diamagnetic properties, which is the tendency of a material to oppose an externally applied magnetic field. Materials that do not have any unpaired electron orbital spin or spin angular momentum are generally diamagnetic. Diamagnetic materials are repelled by an externally applied magnetic field. The magnetic susceptibility values of diamagnetic materials are negative values, which indicate the repulsion of the materials by externally applied magnetic fields. Larger absolute values of the magnetic susceptibilities of diamagnetic materials correlate with larger induced magnetizations and larger repulsive magnetic forces between the diamagnetic materials and an externally applied magnetic field.

Materials with unpaired electrons are paramagnetic. The paired electrons characteristic of diamagnetic materials are required by the Pauli exclusion principle to have their intrinsic spin magnetic moments aligned in opposite orientation, causing their magnetic fields to cancel out. Conversely, the unpaired electrons characteristic of paramagnetic materials are free to align their intrinsic spin magnetic moments in the same direction as an externally applied magnetic field. Therefore, paramagnetic materials exhibit the tendency to enhance an externally applied magnetic field. Paramagnetic materials are attracted by an externally applied magnetic field. The magnetic susceptibility values of paramagnetic materials are positive values, which indicate the attraction of the materials by externally applied magnetic fields. Larger values of the magnetic susceptibilities of paramagnetic materials correlate with larger induced magnetizations and larger attractive magnetic forces between the paramagnetic materials and an externally applied magnetic field.

In the absence of an externally applied magnetic field, diamagnetic and paramagnetic materials do not exhibit any intrinsic or persistent magnetization. The materials generally referred to as permanent "magnets" are ferromagnetic materials. Like paramagnetic materials, ferromagnetic materials also have unpaired electrons. However, unlike paramagnetic materials, ferromagnetic materials exhibit a persistent magnetization in the absence of an externally applied magnetic field. Ferromagnetism arises from the intrinsic tendency of the unpaired electrons of these materials to orient parallel to each other (either co-parallel or anti-parallel, i.e., ferro- and ferri-magnetism, respectively) to minimize their energy state. Ferromagnetic materials are characterized by a Curie point temperature above which a given ferromagnetic material loses its ferromagnetic properties because increased thermal motion within the material disrupts the alignment of the electron's intrinsic spin magnetic moments.

Materials that are negligibly affected by magnetic fields may be referred to as non-magnetic materials notwithstanding the fact that such materials are, by definition, diamagnetic or weakly paramagnetic. The diamagnetic materials found in batteries and other electrochemical cell devices may be considered non-magnetic. These materials include, but are not limited to, plastics, polymer binders, water, organic solvents, lithium salts, graphite (carbon), cadmium, zinc, copper, gold, silicon, lead and lead compounds, and sulfuric acid. Paramagnetic materials found in batteries and other electrochemical cell devices include, for example, aluminum, steel, nickel oxyhydroxide, nickel-metal hydride alloys, and inorganic lithium metal compounds.

Lithium-ion electrochemical cells, for example, generally comprise a cathode, anode, separator, electrolyte, and housing. The cathode comprises an aluminum current collecting plate or foil coated with a particulate lithium metal compound and a polymeric binder such as polyvinylidene fluoride. The particulate lithium metal compound comprises particles of a lithium metal oxide or lithium metal phosphate such as, for example, $LiCoO_2$, $LiMn_2O_4$, $LiFePO_4$, $LiNiO_2$, $LiNiCoMnO_2$, $LiNi_{1/3}Co_{1/3}Al_{1/3}O_2$, $LiNi_{0.8}Co_{0.2}O_2$, or $LiNiO_{0.833}Co_{0.17}O_2$. A given lithium-ion electrochemical cell generally comprises only one of these cathode active materials because their respective electrochemistries are incompatible. $LiCoO_2$ is the most common cathode active material in commercial and industrial lithium-ion electrochemical cells because this material exhibits reliable cathodic performance, high energy density, low self-discharge rate, long cycle time, and ease of manufacture.

The anodes of lithium-ion electrochemical cells generally comprise copper current collecting plates or foils coated with particulate graphite and a polymeric binder such as polyvinylidene fluoride. The cathode and anode are separated by a polymeric separator, such as a polyethylene or polypropylene sheet, and are submerged in the electrolyte. The electrolyte comprises a lithium salt such as $LiPF_6$, $LiBF_4$, or $LiClO_4$ dissolved in an organic solvent such as ethylene carbonate, dimethyl carbonate, or diethyl carbonate. The electrolyte functions as a lithium ion-conducting material that facilitates transport of lithium ions to-and-from the anode and cathode during charging and discharging cycles. For example, a lithium-ion electrochemical cell employing a $LiCoO_2$ cathode active material and a graphite anode active material operates in accordance with the following generalized electrochemical half reactions (forward reaction corresponding to the charging cycle; reverse reaction corresponding to the discharging cycle):

$$6C + xLi^+ + xe^- \leftrightarrows C_6Li_x$$

$$LiCoO_2 \leftrightarrows Li_{(1-x)}CoO_2 + xLi^+ + xe^-$$

Lithium-ion electrochemical cells also comprise a housing, other structural components, and packaging, which may be made from nickel-plated steel, aluminum, and/or plastics. The material composition of an example lithium-ion secondary rechargeable battery is shown in Table 1.

TABLE 1

| Component | Range (Weight Percent) | Example Composition (weight percent) |
| --- | --- | --- |
| Lithium metal compound | 25-30 | 27.5 |
| Steel/nickel | 22-27 | 24.5 |
| Cu/Al | 12-17 | 14.5 |
| Graphite | 14-18 | 16.0 |

TABLE 1-continued

| Component | Range (Weight Percent) | Example Composition (weight percent) |
| --- | --- | --- |
| Electrolyte | 2-6 | 3.5 |
| Polymer/Plastics | 12-16 | 14.0 |

The processes and systems described in this specification comprise the magnetic separation of magnetized particles comprising electrode active materials, such as, for example, lithium metal compounds. As used herein, the term "lithium-metal compound" refers to a compound comprising lithium, at least one additional metal or metal oxide, and an inorganic counter ion such as, for example, oxide ($O_2^{2-}$) or phosphate ($PO_4^{3-}$). In various non-limiting embodiments, a lithium metal compound may be represented by the general formula:

$$LiM_xN_z$$

wherein M is one or more metals selected from the group consisting of Co, Mn, Ni, Fe, and Al, wherein N is an inorganic counter ion selected from the group consisting of $O_2^{2-}$ and $PO_4^{3-}$, wherein x ranges from greater than zero to two ($0<x\le2$), and wherein z ranges from one to five ($1\le z\le5$). In various non-limiting embodiments, a lithium metal compound may comprise $LiCoO_2$, $LiMn_2O_4$, $LiFePO_4$, $LiNiO_2$, $LiNiCoMnO_2$, $LiNi_{1/3}Co_{1/3}Al_{1/3}O_2$, $LiNi_{0.8}Co_{0.2}O_2$, or $LiNiO_{0.833}Co_{0.170}O_2$. In some non-limiting embodiments, a lithium metal compound may comprise a compound of the formula:

$$LiNi_{1-y}Co_yO_2$$

wherein y ranges from zero to 1 ($0\le y\le1$).

Electrochemical cell grade lithium metal compounds are used in a particulate structural form (i.e., powdered form) as the active materials to produce lithium-ion electrochemical cell cathodes. Powdered lithium metal compounds as a cathode active material may be obtained by calcining a mixture of a lithium compound powder and one or more metal compound powders to produce particles of a lithium metal compound. The lithium compound powder and the metal compound powders are, respectively, compounds that can produce corresponding oxides or phosphates by calcination of the powders. For example, mixtures of powdered oxides, hydroxides, carbonates, carbides, phosphates, and the like, of lithium, cobalt, manganese, nickel, iron, and aluminum, including mixed metal compounds, may be calcined to produce particulate lithium metal compound powders, which may be used to form the cathode active material coatings on current collecting plates or foils. Examples of suitable lithium compounds include $Li_2O$, $Li_2CO_3$, and the like. Examples of suitable cobalt compounds include $Co(OH)_2$, $Co_2(CO_3)(OH)_2$, $Co_2O_3$, and the like. Examples of suitable nickel compound include $Ni(OH)_2$, $Ni_2(CO_3)(OH)_2$, $Ni_2O_3$, and the like. Other suitable materials include various manganese, iron, and aluminum oxides, hydroxides, and the like.

The particulate lithium metal compound powders used to form the active material coatings on current collecting plates or foils in lithium-ion electrochemical cells generally have an average particle size in the nanometer to micrometer range. In various embodiments, lithium-ion electrochemical cells may comprise cathodes comprising lithium metal compound powders having average particle sizes in the range of 10 nanometers to 1000 micrometers, and often in the range of 1 micrometer to 20 micrometers. For example, some lithium-ion electrochemical cells comprise tape-casted or painted electrodes comprising virgin (unprocessed) graphite particles having a D90 value of 14 micrometers, and virgin $LiMn_2O_4$ or $LiNiCoMnO_2$ having D90 values of 5.4 micrometers and 15.6 micrometers, respectively, wherein the D90 value is the particle size below which lies 90 percent of the volume of a particle sample.

As described above, a given lithium-ion electrochemical cell generally comprises only one lithium metal compound as the cathode active material because the electrochemistries of different lithium metal compounds are generally incompatible in an operable lithium-ion electrochemical cell. However, scrap battery and electrochemical cell streams generally comprise a mixture of lithium-ion electrochemical cells, which may comprise different lithium metal compounds, and other types of electrochemical cells including nickel-metal hydride, nickel-zinc, nickel-cadmium, lead-acid, zinc-carbon, and/or alkaline. Therefore, it is important to separate the different lithium metal compounds from each other in mixed electrochemical cell scrap streams, while maintaining the different lithium metal compounds in their electrode-active structural and chemical forms, in order to directly re-use the recovered lithium metal compounds in the manufacture of new batteries. This is accomplished in accordance with various embodiments described in this specification by utilizing the different magnetic susceptibilities of different lithium metal compounds, which are paramagnetic and, therefore, will exhibit different magnetization behavior when subjected to an externally applied magnetic field.

As described, for example, in Julien et al., "Magnetic properties of lithium intercalation compounds," *Ionics*, Volume 12, Number 1, 2006, pp. 21-32, which is incorporated by reference into this specification, electrochemical cell-grade lithium metal compounds are generally paramagnetic in the discharged and charged states and each possess different magnetic susceptibility values. The differences in the magnetic susceptibility values of the different lithium metal compounds used as cathode active materials allows the use of different magnetic field intensities and/or magnetic field gradients to differentially magnetize the lithium metal compound particles in mixed scrap electrochemical cell streams. The differential magnetization of the different lithium metal compounds in mixed scrap electrochemical cell streams allows for the induction of attractive magnetic forces having different magnitudes between an externally applied magnetic field and the different lithium metal compound particles. The different magnitudes of the induced magnetic forces allow for the selective separation of a single lithium metal compound from a mixture comprising multiple lithium metal compounds, graphite, and/or other electrochemical cell materials. In this manner, various constituents of mixed scrap electrochemical cell streams comprising a plurality of electrode active materials may be efficiently separated to produce high purity electrode active material concentrates.

The embodiments described in this specification may produce purified concentrates of electrode active materials, such as, for example, graphite and differentiated lithium metal compounds, which retain their original structural form (e.g., particle size and crystallography) and their original chemical composition as present in the scrap electrochemical cells. The high purity separation of the electrode active materials enables the direct re-use of the recycled materials in the production of new electrochemical cells, eliminating the need for further post-processing (e.g., hydrometallurgical or pyrometallurgical processes) and synthesis (e.g., powder calcination) of the electrode active materials. In various non-limiting embodiments, a process for the separation of materials from electrochemical cells comprises the steps shown in FIG. 1, which is a flowchart diagram illustrating a process 10 for the separation of materials from electrochemical cells.

Referring to FIG. 1, scrap electrochemical cells (e.g., scrap batteries) are input to the process 10 at step 12. The scrap electrochemical cells are processed at step 14 to remove the anode materials and the cathode materials from the other components comprising the electrochemical cells forming the scrap, thereby removing the particulate electrode materials. The removal of the anode materials and the cathode materials at step 14 may comprise one or more unit operations such as, for example, pre-sorting of different electrochemical cell chemistries; disassembling of electrochemical cell modules (e.g., battery assemblies); discharging electrochemical cells; draining of electrolyte; solvent or supercritical fluid extraction of electrolyte; pyrolysis or heat treatment to thermally degrade and remove plastics, electrolyte, and/or binder; crushing, milling, shredding, or otherwise comminuting electrochemical cells; and screening, sieving, or otherwise classifying comminuted electrochemical cell materials.

In various non-limiting embodiments, scrap batteries and other electrochemical cell devices may be pre-sorted based on their respective cell chemistry, e.g., zinc-carbon, alkaline, lead-acid, nickel-zinc, nickel-cadmium, nickel-metal hydride, lithium-ion, and the like. One or more of the pre-sorted electrochemical cell types may be input to the processes and systems described herein. In various non-limiting embodiments, the electrochemical cells input to the processes and systems comprise lithium-ion electrochemical cells. Notwithstanding the utilization of an optional pre-sorting operation, it is expected that some electrochemical cells comprising operational chemistries other than lithium-ion-based chemistries may be incidentally or intentionally input to the separation processes and systems. An advantage of the processes and systems described in this specification is the capability of providing a robust separation and concentration of electrode active materials from mixed electrochemical cell scrap comprising different types of electrochemical cells.

In various non-limiting embodiments, scrap battery and other electrochemical cell modules and assemblies may be disassembled to remove the electrochemical cells from other components such as packaging, housings, electrical leads, other circuitry, and the like. For example, some multi-cell batteries, such as those used in hybrid and fully electric automobiles, may be configured for facile separation into individual electrochemical cells. Alternatively, scrap batteries and other electrochemical cell devices may be processed in an as-received form.

In various non-limiting embodiments, scrap battery and other electrochemical cell modules and assemblies may be processed to ensure complete electrical discharge. Scrap electrochemical cells may be received in any charge state ranging from fully discharged to fully charged. The charge state of the electrochemical cells may be determined, for example, by connecting a resistive load across the terminal electrodes of the battery and measuring the current flowing through the resistive load. If a test reveals that an electrochemical cell device is not fully discharged, then a resistive load may be connected across the terminals of the device for such time as to ensure complete discharge. In various other non-limiting embodiments, scrap electrochemical cells may be soaked in an aqueous or non-aqueous salt solution (e.g., aqueous sodium chloride brine solution) of sufficient conductivity to cause electrical discharge.

Scrap electrochemical cells generally comprise an electrolyte that must be removed from the devices before the electrode materials can be separated from the other components comprising the electrochemical cells. Liquid electrolytes may be drained or otherwise passively removed from scrap electrochemical cells. Alternatively, or in addition, electrolyte may be removed from scrap electrochemical cells using a fluid displacement and/or solvent extraction operation in which the electrochemical cells are breached and penetrated with a fluid that physically displaces and/or dissolves and washes out the electrolyte. In various non-limiting embodiments, scrap electrochemical cells may be subjected to a gaseous, liquid, or supercritical fluid displacement and/or extraction operation as described in U.S. Pat. Nos. 7,198,865; 7,858,216; and 8,067,107; and in U.S. Patent Application Publication No. 2011-0272331 A1, each of which is incorporated by reference into this specification.

In various non-limiting embodiments, scrap electrochemical cells may be comminuted to form a particulate mixture of electrochemical cell components that can be classified by particle size. The comminution of scrap electrochemical cells may be performed, for example, using a crushing, milling, and/or shredding operation. Examples of suitable comminution equipment include, but are not limited to, vertical cutting mills, hammer mills, knife mills, slitter mills, ball mills, pebble mills, and the like. The comminuted electrochemical cell components may then be classified and separated based on particle size to remove and separate plastic casing materials, steel or aluminum casing materials, plastic separator materials, circuit components, and other non-electrode materials from the particulate electrode materials. The size classification and separation of comminuted electrochemical cell materials may be performed, for example, using a screening or sieving operation. Such unit operations may be performed, for example, using multiple differently-sized sieves, air tables, vibration screens, and like equipment.

In various non-limiting embodiments, multiple comminution-classification stages may be conducted in series to remove non-electrode materials from the particulate electrode active materials and to refine the electrode active material particle sizes by breaking-up agglomerates of electrode active material particles. Alternatively, or in addition, comminuted electrochemical cell components may be subjected to a preliminary magnetic separation operation to remove ferromagnetic and very highly paramagnetic materials such as, for example, steel casing and housing materials. It is understood that a preliminary magnetic separation operation to remove ferromagnetic and very highly paramagnetic materials from comminuted electrochemical cells before the formation of a slurry (see step 16 in FIG. 1, described below) is different than the magnetic separation and concentration of electrode active materials (see steps 18-24 in FIG. 1, described below).

Referring to FIG. 1, electrochemical cell black mass is the product of the one or more unit operations at step 14 comprising the removal of anode and cathode materials. As used herein, the term "black mass" refers to the finest particulate fraction classified from comminuted electrochemical cells. The black mass is a powder comprising electrode materials including electrode active materials, polymeric binder, residual aluminum and copper current collection material, and other residual particulates. The chemical composition of black mass depends upon the chemistry of the scrap electrochemical cells input to the process 10 at step 12. For example, in accordance with various embodiments described in this specification, the black mass produced at step 14 may comprise any material, or combination of materials, selected from the group consisting of lead and lead compounds, zinc and zinc compounds, cadmium and cadmium compounds, copper, aluminum, nickel oxyhydroxide, nickel-metal hydride alloys, graphite, lithium metal compounds, polymeric binder, and combinations of any thereof. Of these materials, aluminum, nickel oxyhydroxide, nickel-metal hydride alloys, and lithium metal compounds are paramagnetic and the others are diamagnetic.

The black mass produced at step 14 may be used to form a slurry at step 16. As used herein, the term "slurry" refers to any fluidized suspension or dispersion of black mass particles, including, for example, aqueous liquid slurries, non-aqueous liquid slurries, mixed-solvent liquid slurries, and gaseous slurries, i.e., pneumatic transport in pressurized air, nitrogen ($N_2$), carbon dioxide ($CO_2$) and/or like gases. In various non-limiting embodiments, the production of a slurry comprising electrochemical cell black mass particles may comprise one or more unit operations such as, for example, solvent wash treatment, water rinse treatment, froth flotation treatment, mechanical dispersion, and/or ultrasonic dispersion.

In various non-limiting embodiments, black mass may be treated with a wash solvent to dissolve and remove polymeric electrode binder, such as, for example, polyvinylidene fluoride, from the electrode active materials (e.g., graphite, lithium metal compounds, nickel oxyhydroxide, and the like). Suitable wash solvents include, for example, N-methyl-2-pyrrolidone, tetrahydrofuran, ethanol, dimethyl carbonate, diethylcarbonate, dimethyl acetamide, diethyl formamide, methyl isobutyl ketone, and combinations of any thereof. Alternatively, or in addition, black mass may be treated with a water rinse before, after, or instead of a solvent wash treatment. Alternatively, or in addition, black mass may be heat treated or subject to a pyrolysis treatment. For example, black mass may be exposed to elevated temperatures in air or other oxidizing environments. Heat or pyrolysis treatments may be performed at environmental temperatures of at least 300° C., for example.

In various non-limiting embodiments, black mass may be subjected to a froth floatation treatment to remove lead and lead compounds from the black mass, which may be inadvertently or intentionally present due to the presence of lead-acid batteries in the scrap electrochemical cell devices input to the processes and systems. For example, black mass may be subjected to a froth floatation treatment as described in U.S. Patent Application Publication No. 2011-0272331 A1, which is incorporated by reference into this specification. In various non-limiting embodiments, black mass comprising Pb(II) and Pb(IV) compounds may be suspended in water in a froth flotation vessel with a froth flotation agent and sparged with air to entrain hydrophobically-modified lead compound materials and float the lead-based materials out of the vessel, thereby removing the lead-based materials from the black mass.

The production of a slurry comprising black mass particles may comprise the dispersion or suspension of the black mass particles in a carrier fluid. Carrier fluids include liquids such as, for example, water, alcohols, hydrocarbons, condensed carbon dioxide, and the like, and gases such as, for example, air, nitrogen, carbon dioxide, and the like. In some embodiments, a slurry may comprise from 5 percent to 50 percent (by mass) of black mass solids content or any sub-range subsumed therein, such as, for example, 10-40%, 20-40%, or 30-40% black mass solids by mass. In various non-limiting embodiments, the black mass slurry may be subjected to an ultrasonic dispersion operation to break-up particle agglomerates and further refine the particle size. In various non-limiting embodiments, the production of an aqueous liquid slurry comprising black mass particles may use distilled and/or deionized, pH-neutral water to maintain the chemistry of the constituent electrode active material particles. The dispersion or suspension of the black mass particles in a carrier fluid should employ appropriate mixing equipment to maintain particles in dispersion or suspension and avoid accumulation of non-dispersed or non-suspended particles.

Referring to FIG. 1, the slurry comprising electrode active materials such as graphite, lithium metal compounds, and the like, is subjected to a magnetic field at step 18. The slurry is subjected to a magnetic field of sufficient magnetic field intensity and/or magnetic field gradient to magnetize paramagnetic particles comprising the slurry. For example, the magnetic field may magnetize particles comprising at least one lithium metal compound. The magnetization of particles comprising the slurry induces a magnetic force between the magnetized particles and an active magnetic surface in contact with the slurry at step 20. The attractive nature of the induced magnetic force separates the magnetized particles from the slurry at step 22, for example, by pinning the magnetized particles to the active magnetic surface in contact with the slurry, thereby overcoming the fluid drag forces of the slurry carrier fluid and retaining the magnetized particles as a magnetic fraction while eluting a non-magnetic fraction. By controlling the magnetic field intensity and/or gradient, and the nature of the active magnetic surface, predetermined electrode active materials separated from the slurry may be concentrated and purified to produce an electrode active material concentrate at step 24.

The magnetization, separation, and/or concentration of electrode active materials from a black mass slurry may be performed using magnetic separation equipment such as, for example, high-intensity magnetic filters, wet high-intensity magnetic separators, and wet drum separators. Such equipment is available, for example, from Eriez Manufacturing Company, Erie, Pa., USA. In addition, superconducting/high-gradient magnetic separation equipment comprising supercooled electromagnets may be used to maintain high magnetic intensities.

High-intensity magnetic filters and wet high-intensity magnetic separators comprise high-intensity electromagnets and a magnetic flux-converging matrix to concentrate paramagnetic materials. The externally applied magnetic field from the electromagnets induces a magnetization in the flux-converging matrix that produces a zone of high magnetic gradient. Paramagnetic particles passing through the high magnetic gradient zone are also magnetized, which induces an attractive magnetic force between the magnetized particles and the flux-converging matrix, which functions as an active magnetic surface to which the magnetized particles may be pinned, thereby overcoming fluid drag forces of a carrier fluid and retaining the magnetized particles as a magnetic fraction while eluting a non-magnetic fraction. The retained magnetic fraction may be collected from a high-intensity magnetic filter or wet high-intensity magnetic separator by de-energizing the electromagnets, which removes the induced magnetic field and the induced attractive force between the retained particles and the flux-converging matrix, and flushing the particles from the equipment with clean carrier fluid.

Figure 2:
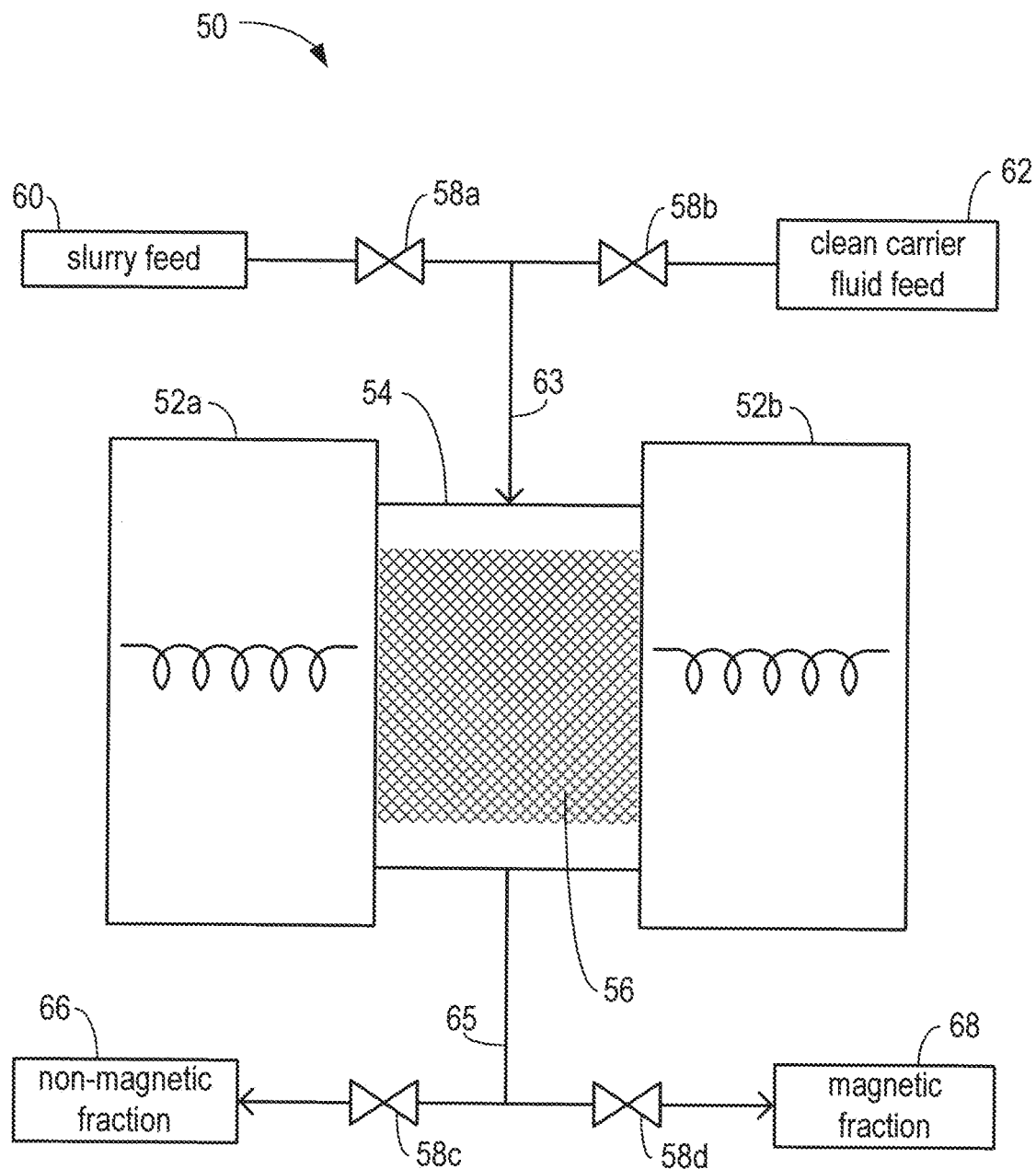
FIG. 2 is a schematic diagram of a high-intensity magnetic filtration/separation system.

FIG. 2 schematically illustrates a high-intensity magnetic filter/wet high-intensity magnetic separator system 50, which may be used in various non-limiting embodiments. The system 50 comprises two electromagnetic coils 52a and 52b in an opposed orientation across a separation box 54. The opposed electromagnetic coils 52a and 52b are positioned in a Helmholz-type coil orientation and provide magnetic poles between which an essentially uniform magnetic field is established. The externally applied magnetic field passes through the separation box 54 and the magnetic flux-converging matrix 56. The magnetic flux-converging matrix 56 is positioned within the separation box 54 to intensify the magnetic field gradient within the separation box 54 and to function as an active magnetic surface to which magnetized particles are pinned during a separation. The magnetic flux converging matrix 54 may comprise an expanded metal grid material. The magnetic flux converging matrix 54 may also comprise grooved plates, steel balls, and/or steel wool, for example.

The separation box 54 comprises inlet port 63 and outlet port 65 for the flow of a slurry through the separation box 54 during operation. The slurry is pumped, drained, or otherwise flowed through the separation box 54 from a slurry feed 60. The system 50 operates by flowing the slurry through the separation box 54 and the magnetic flux-converging matrix 56 with the magnetic coils 52a and 52b in an energized state. The magnetic field established in the separation box 54 magnetizes the magnetic flux-converging matrix 56 intensifying the magnetic field gradient within the separation box 54. Magnetized particles in the slurry flowing through the separation box 54 are separated from the slurry by magnetic force between the particles and the active magnetic surfaces provided by the magnetic flux-converging matrix 56. The separated particles collect in the magnetic flux-converging matrix 56 during operation and non-magnetic particles are carried through the separation box 54 and the magnetic flux-converging matrix 56 by fluid drag forces in the slurry flow. The non-magnetic fraction is collected in collection vessel 66. The particles retained in the magnetic flux-converging matrix 56 are flushed out of the separation box 54 by flowing clean carrier fluid from a clean carrier fluid feed 62 and through the separation box 54 after discontinuing the slurry flow from slurry feed 60 and after de-energizing the electromagnetic coils 52a and 52b. The flushed magnetic fraction is collected in collection vessel 68. The flow of slurry, clean carrier fluid, non-magnetic fractions, and flushed magnetic fractions may be controlled, for example, by manipulating valves 58a, 58b, 58c, and 58d, and other transport equipment such as pumps (not shown).

Depending on the intensity of the magnetic field established in the separation box 54 and the magnetic susceptibility of paramagnetic material comprising the slurry, paramagnetic particles may be magnetized and pinned to the active magnetic surface provided by the magnetic flux-converging matrix 56. Accordingly, the intensity of the magnetic field established in the separation box 54 may be controlled by controlling the current supplied to the electromagnetic coils 52a and 52b, which in turn may be used to control the separation of electrode active materials comprising a slurry by retaining predetermined paramagnetic compounds, such as lithium metal compounds, while passing non-magnetic compounds such as graphite. This capability may be used to separate and concentrate the various electrode active materials comprising the slurry fed to system 50.

In various non-limiting embodiments, a process or system comprising a high-intensity magnetic filter or a wet high-intensity magnetic separator may be used to separate materials from electrochemical cells in accordance with this specification. A process or system comprising a high-intensity magnetic filter or a wet high-intensity magnetic separator may be operated in a batch or semi-batch manner. For example, a slurry comprising multiple different electrode active materials such as graphite and one or more lithium metal compounds may be fed to a high-intensity magnetic filter or a wet high-intensity magnetic separator operating at a magnetic field intensity sufficient to retain a paramagnetic electrode active material. The resulting magnetic fraction may comprise a lithium metal compound concentrate, for example, and the non-magnetic fraction may comprise graphite and lithium metal compounds possessing lower magnetic susceptibility values than the magnetically retained compound.

For example, if the slurry originally comprised two or more lithium metal compounds having different magnetic susceptibility values, the non-magnetic fraction comprising graphite and the lesser magnetically susceptible lithium metal compounds may be fed to a high-intensity magnetic filter or a wet high-intensity magnetic separator operating at a higher magnetic field intensity sufficient to retain the lithium metal compound possessing the next largest magnetic susceptibility value but passing the graphite and the lithium metal compounds possessing lower magnetic susceptibility values. The resulting magnetic fraction may comprise a second lithium metal compound concentrate and the resulting non-magnetic fraction may comprise a graphite concentrate or a refined mixture of graphite and lesser magnetically susceptible lithium metal compounds. In this manner, the non-magnetic fractions may be sequentially passed through a high-intensity magnetic filter or a wet high-intensity magnetic separator operating at sequentially higher magnetic field intensities, thereby sequentially separating and concentrating various electrode active materials based on their successively lower magnetic susceptibility values. Also, in this manner, additional non-lithium-based paramagnetic electrode active materials such as nickel oxyhydroxides or nickel metal hydride alloys may be separated and concentrated from a feed slurry comprising a mixed black mass isolated from multiple different electrochemical cell types such as nickel metal hydride and lithium-ion cells.

Figure 3:
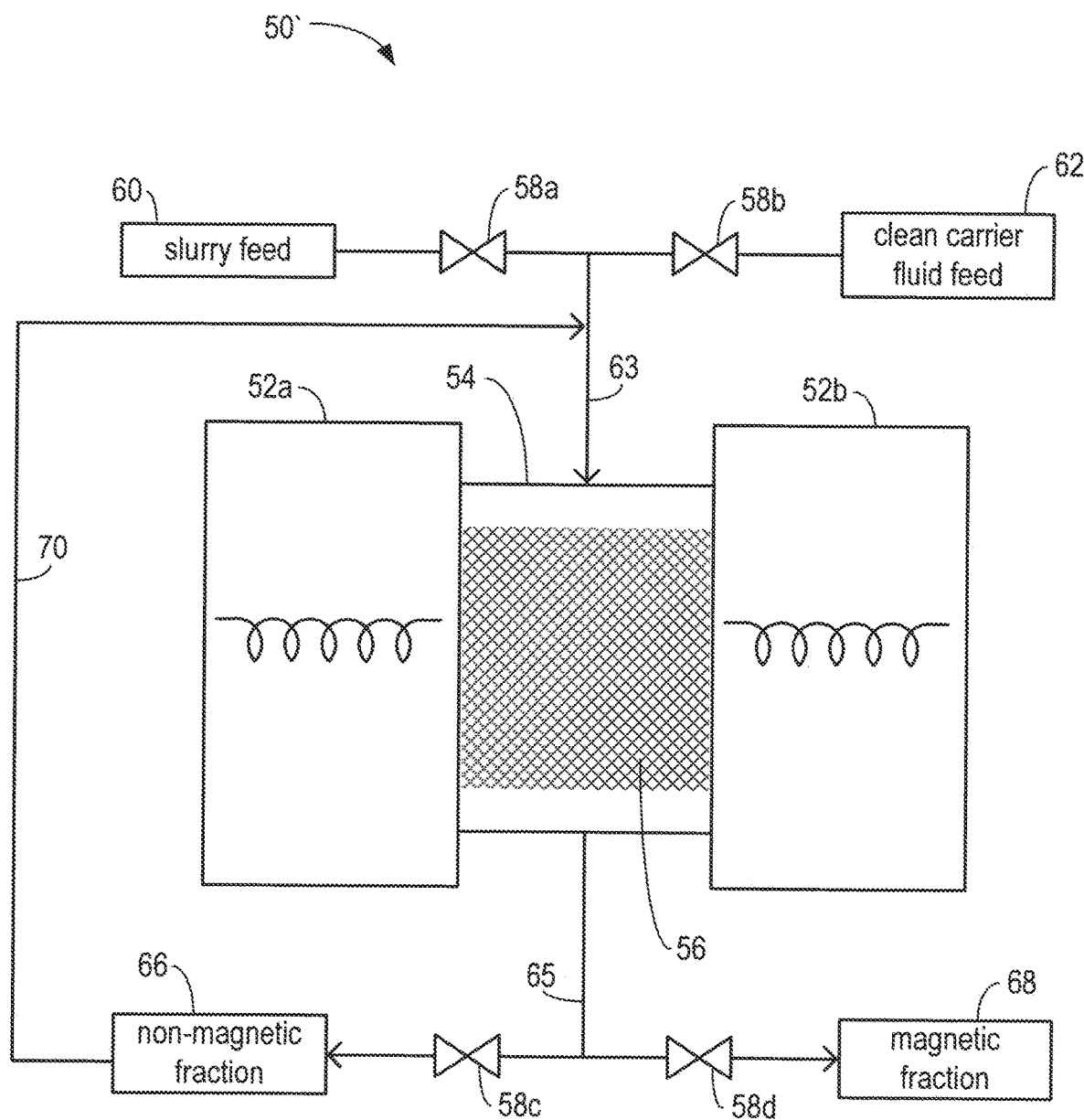
FIG. 3 is a schematic diagram of a high-intensity magnetic filtration/separation system comprising a recycle feature.

FIG. 3 schematically illustrates a non-limiting embodiment of a system 50' in which sequentially staged separation of multiple electrode active materials from a feed slurry comprises a recycle line 70 that feeds the collected non-magnetic fraction back into the separation box 54. While the recycle feature is shown in FIG. 3 as a material transport line, it is understood that the recycle of non-magnetic fractions may be implemented manually or using any suitable combination of material transport equipment in a batch or semi-batch operational mode.

Figure 4:
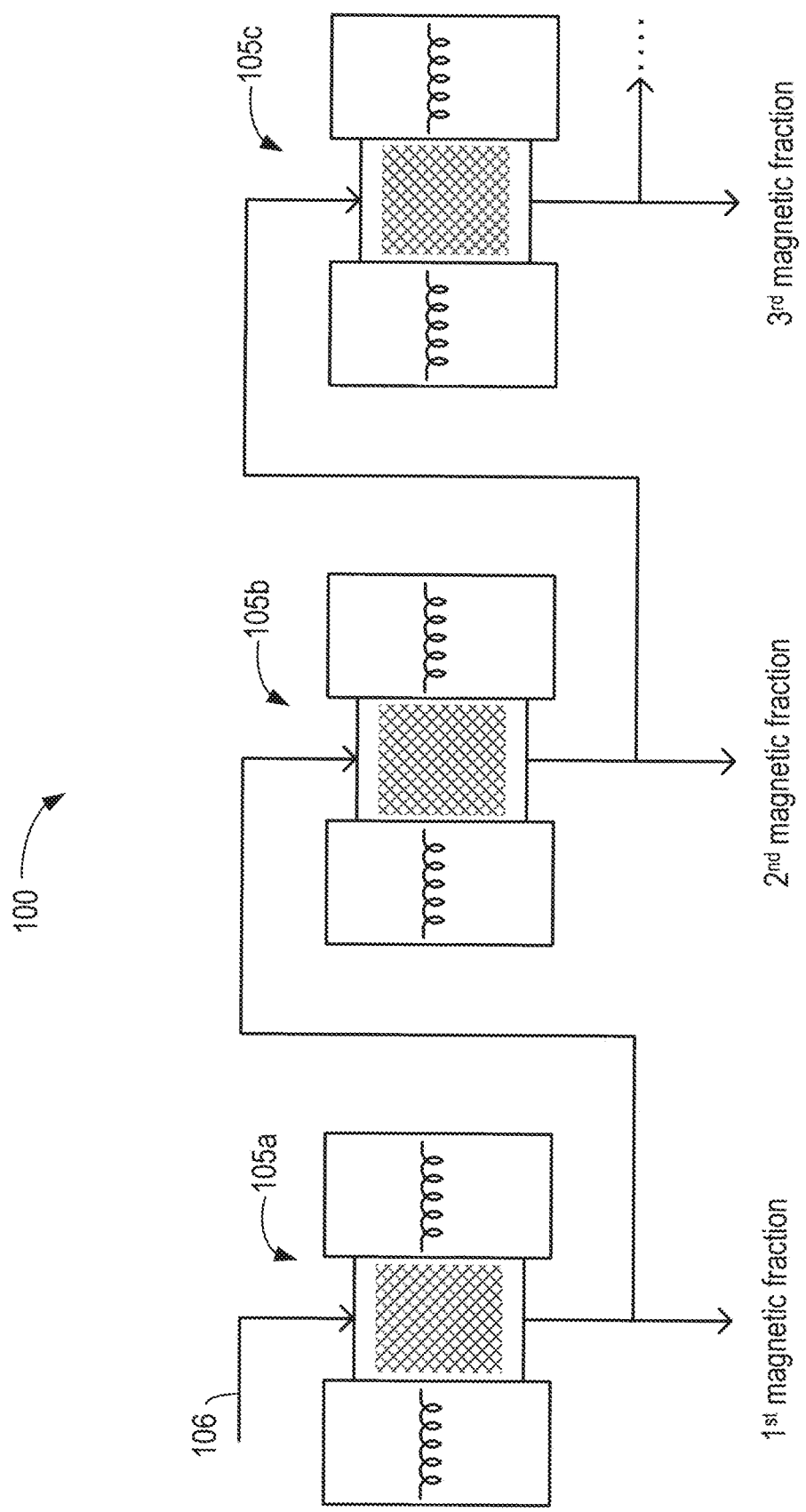
FIG. 4 is a process and system flow diagram illustrating a plurality of high-intensity magnetic filters/separators connected in series.

FIG. 4 schematically illustrates a non-limiting embodiment of a system 100 in which sequentially staged separation of multiple electrode active materials from a feed slurry comprises multiple high-intensity magnetic filters and/or wet high-intensity magnetic separators 105a, 105b, and 105c fluidly connected in series and operating at sequentially higher magnetic field intensities. An initial slurry feed 106 is fed to a first magnetic separator 105a where a first magnetic fraction is retained comprising the slurry constituent possessing the largest magnetic susceptibility value. The first magnetic fraction is subsequently collected as a first electrode active material concentrate. A first non-magnetic fraction passes the first magnetic separator 105a and is fed to a second magnetic separator 105b where a second magnetic fraction is retained comprising the slurry constituent possessing the second largest magnetic susceptibility value. The second magnetic fraction is subsequently collected as a second electrode active material concentrate. A second non-magnetic fraction passes the second magnetic separator 105b and is fed to a third magnetic separator 105c where a third magnetic fraction is retained comprising the slurry constituent possessing the third largest magnetic susceptibility value. The third magnetic fraction is subsequently collected as a third electrode active material concentrate. A third non-magnetic fraction passes the third magnetic separator 105c and may comprise a non-magnetic electrode active material concentrate, such as, for example, a graphite concentrate, that may be collected. Alternatively, the third non-magnetic fraction may be fed to subsequent unit operations such as additional magnetic separation stages for further refinement.

It is understood that any number of magnetic separation stages may be utilized in an implementation of the processes and systems described in this specification, any number of which may be connected in series or in parallel, and any number of which may comprise recycle features as described in connection with FIG. 3.

Drum separators comprise a stationary magnet assembly located within a rotating drum positioned in a slurry tank. The externally applied magnetic field from the magnet assembly induces a magnetization in the drum surface as it rotates past the magnet assembly, which produces a zone of high magnetic gradient. Paramagnetic particles passing through the high magnetic gradient zone are also magnetized by the externally applied magnetic field, which induces an attractive magnetic force between the magnetized particles and the magnetized drum surface when the surface is located adjacent to the magnet assembly. The drum surface functions as an active magnetic surface to which the magnetized particles may be pinned, thereby overcoming fluid drag forces of a slurry carrier fluid and retaining the magnetized particles on the drum surface while the drum surface is located adjacent to the magnet assembly. As the rotating drum surface proceeds away from the magnet assembly, the magnetic field weakens, the drum surface and pinned particles are de-magnetized, and the previously magnetized particles detach from the drum surface and elute as a magnetic fraction. The balance of the feed slurry elutes as a non-magnetic fraction.

Figure 5A:
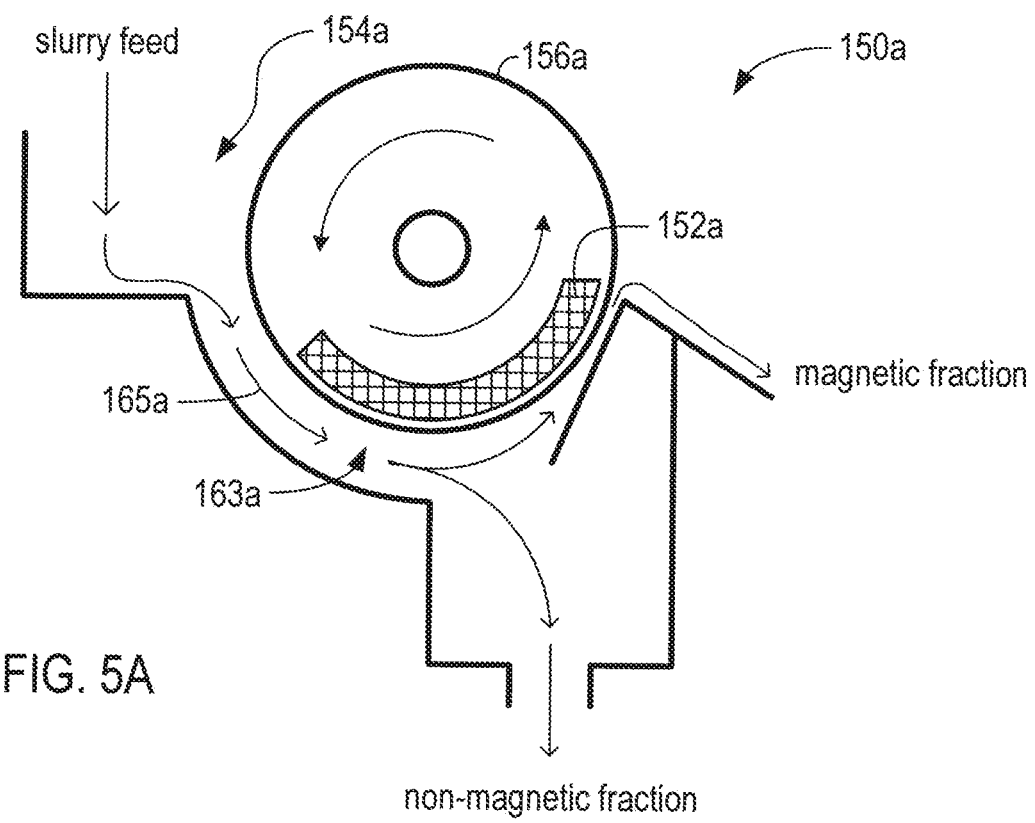
FIG. 5A is a schematic diagram illustrating a concurrent flow tank drum separator.
Figure 5B:
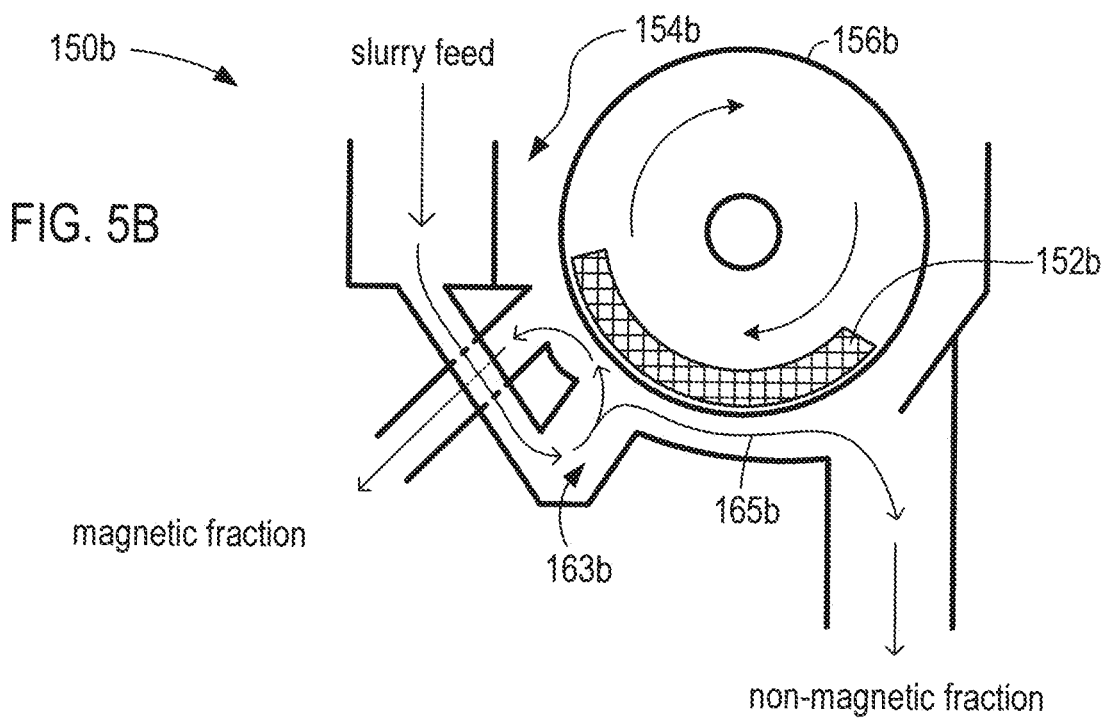
FIG. 5B is a schematic diagram illustrating a counter-rotation flow tank drum separator.

FIGS. 5A and 5B schematically illustrate a concurrent tank drum separator 150a and a counter-rotation tank drum separator 150b, respectively. As shown in FIG. 5A, the tank drum separator 150a comprises a stationary magnet assembly 152a located within a rotating drum 156a positioned in a slurry tank 154a. The externally applied magnetic field from the magnet assembly 152a induces a magnetization in the drum surface 156a as it rotates past the magnet assembly 152a, which produces a zone 163a of high magnetic gradient. Paramagnetic particles passing through the high magnetic gradient zone 163a are also magnetized by the magnet assembly 152a, which induces an attractive magnetic force between the magnetized particles and the magnetized drum surface 156a when the surface is located adjacent to the magnet assembly 152a. The drum surface 156a functions as an active magnetic surface to which the magnetized particles may be pinned, thereby overcoming fluid drag forces of a slurry carrier fluid and retaining the magnetized particles on the drum surface 156a while the drum surface is located adjacent to the magnet assembly 152a. As the counterclockwise rotating drum surface 156a proceeds away from the magnet assembly 152a, the magnetic field weakens, the drum surface and pinned particles are de-magnetized, and the previously magnetized particles detach from the drum surface and elute as a magnetic fraction. The balance of the feed slurry elutes as a non-magnetic fraction. The counter-clockwise rotation of the drum surface 156a is generally concurrent with the direction of slurry flow as indicated by arrows 165a.

As shown in FIG. 5B, the tank drum separator 150b comprises a stationary magnet assembly 152b located within a rotating drum 156b positioned in a slurry tank 154b. The externally applied magnetic field from the magnet assembly 152b induces a magnetization in the drum surface 156b as it rotates past the magnet assembly 152b, which produces a zone 163b of high magnetic gradient. Paramagnetic particles passing through the high magnetic gradient zone 163b are also magnetized by the magnet assembly 152b, which induces an attractive magnetic force between the magnetized particles and the magnetized drum surface 156b when the surface is located adjacent to the magnet assembly 152b. The drum surface 156b functions as an active magnetic surface to which the magnetized particles may be pinned, thereby overcoming fluid drag forces of a slurry carrier fluid and retaining the magnetized particles on the drum surface 156b while the drum surface is located adjacent to the magnet assembly 152b. As the clockwise rotating drum surface 156b proceeds away from the magnet assembly 152b, the magnetic field weakens, the drum surface and pinned particles are de-magnetized, and the previously magnetized particles detach from the drum surface and elute as a magnetic fraction. The balance of the feed slurry elutes as a non-magnetic fraction. The clockwise rotation of the drum surface 156b is generally counter-current with the direction of slurry flow as indicated by arrows 165b.

Depending on the intensity of the magnetic field established in the high magnetic gradient zones 162a and 163b, and the magnetic susceptibility of paramagnetic material comprising the slurry, paramagnetic particles may be magnetized and pinned to the active magnetic surface provided by the drum surfaces 156a and 156b. Accordingly, the intensity of the magnetic field established in the high magnetic gradient zones 162a and 163b may be used to control the separation of electrode active materials comprising a slurry by retaining predetermined paramagnetic compounds, such as lithium metal compounds, while passing non-magnetic compounds such as graphite. This capability may be used to separate and concentrate the various electrode active materials comprising the feed slurry.

In various non-limiting embodiments, a process or system comprising a drum separator may be used to separate materials from electrochemical cells in accordance with this specification. A process or system comprising a drum separator may be operated in a continuous, batch, or semi-batch manner. For example, a slurry comprising multiple different electrode active materials such as graphite and one or more lithium metal compounds may be fed to a drum separator operating at a magnetic field intensity sufficient to pin and separate a paramagnetic electrode active compound from the slurry. The resulting magnetic fraction may comprise a lithium metal compound concentrate, for example, and the non-magnetic fraction may comprise graphite and lithium metal compounds possessing lower magnetic susceptibility values than the magnetically retained compound.

For example, if the slurry originally comprised two or more lithium metal compounds having different magnetic susceptibility values, the non-magnetic fraction comprising graphite and the lesser magnetically susceptible lithium metal compounds may be fed to a drum separator operating at a higher magnetic field intensity sufficient to pin and separate the lithium metal compound possessing the next largest magnetic susceptibility value but passing the graphite and the lithium metal compounds possessing lower magnetic susceptibility values. The resulting magnetic fraction may comprise a second lithium metal compound concentrate and the resulting non-magnetic fraction may comprise a graphite concentrate or a refined mixture of graphite and lesser magnetically susceptible lithium metal compounds. In this manner, the non-magnetic fractions may be sequentially passed through a drum separator operating at sequentially higher magnetic field intensities, thereby sequentially separating and concentrating various electrode active materials based on their successively lower magnetic susceptibility values. Also, in this manner, additional non-lithium-based paramagnetic electrode active materials such as nickel oxyhydroxides or nickel metal hydride alloys may be separated and concentrated from a feed slurry comprising a mixed black mass isolated from multiple different electrochemical cell types such as nickel metal hydride and lithium-ion cells.

Figure 6:
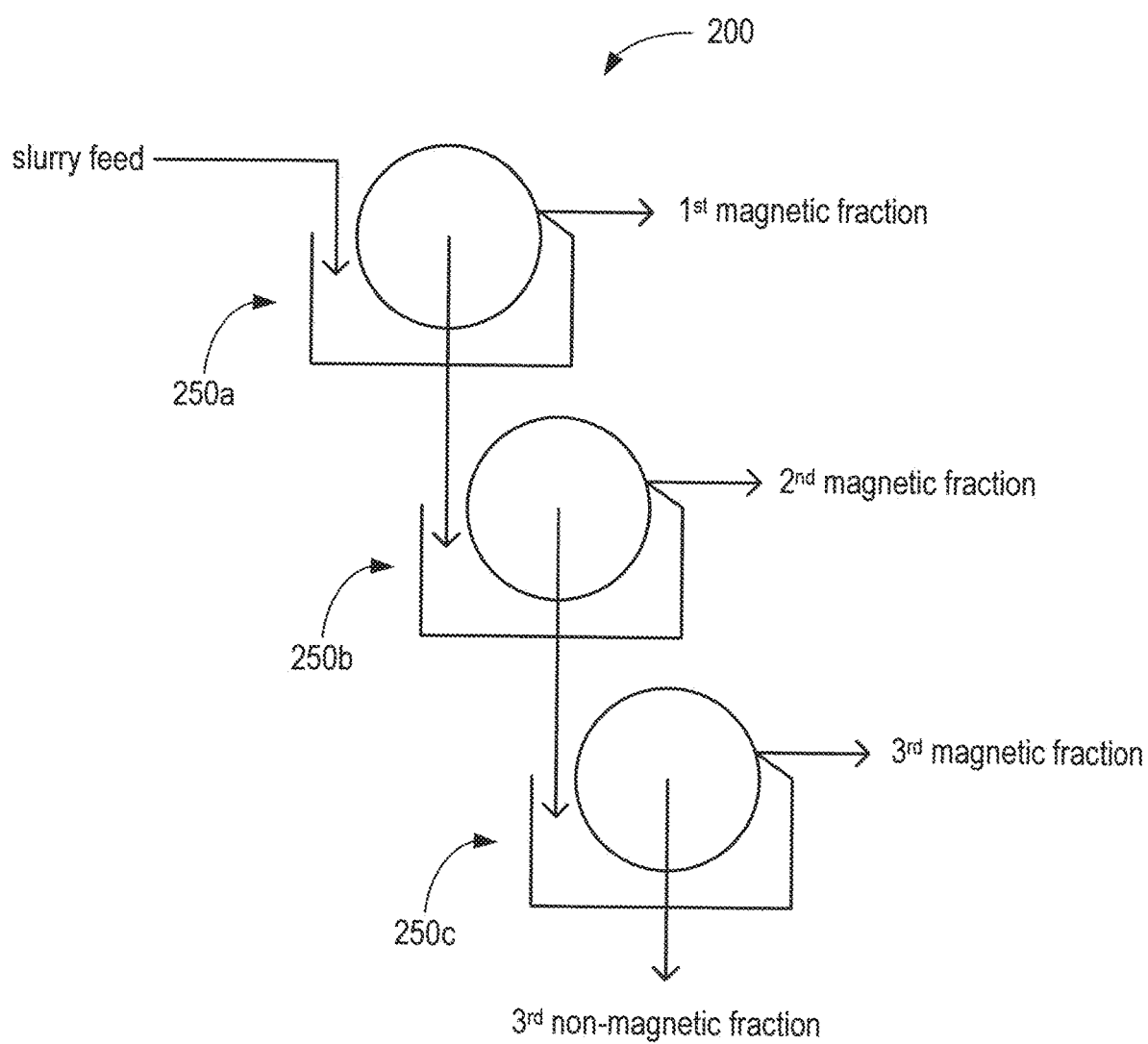
FIG. 6 is a process and system flow diagram illustrating a plurality of drum separators connected in series.

FIG. 6 schematically illustrates a non-limiting embodiment of a system 200 in which sequentially staged separation of multiple electrode active materials from a feed slurry comprises multiple drum separators 250a, 250b, and 250c fluidly connected in series and operating at sequentially higher magnetic field intensities. An initial slurry feed is fed to a first drum separator 250a where a first magnetic fraction comprising the slurry constituent possessing the largest magnetic susceptibility value is separated from the slurry feed. The first magnetic fraction is collected as a first electrode active material concentrate. A first non-magnetic fraction passes the first drum separator 250a and is fed to a second drum separator 250b where a second magnetic fraction comprising the slurry constituent possessing the second largest magnetic susceptibility value is separated from the first non-magnetic fraction. The second magnetic fraction is collected as a second electrode active material concentrate. A second non-magnetic fraction passes the second drum separator 250b and is fed to a third drum separator 250c where a third magnetic fraction comprising the slurry constituent possessing the third largest magnetic susceptibility value is separated from the second non-magnetic fraction. The third magnetic fraction is collected as a third electrode active material concentrate. A third non-magnetic fraction passes the third drum separator 250c and may comprise a non-magnetic electrode active material concentrate, such as, for example, a graphite concentrate, that may be collected. Alternatively, the third non-magnetic fraction may be fed to subsequent unit operations such as additional drum separation stages for further refinement.

Figure 7:
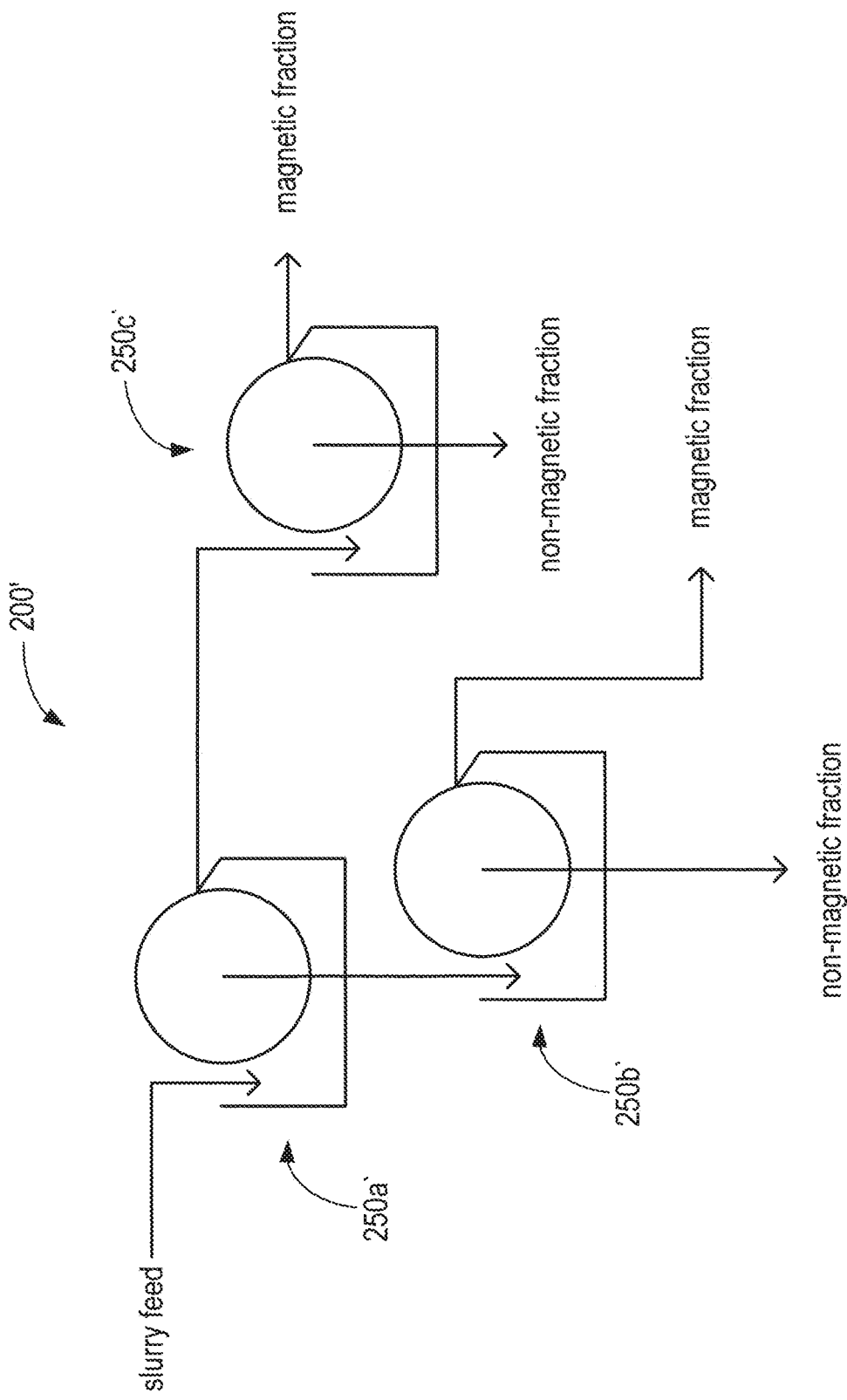
FIG. 7 is a process and system flow diagram illustrating a plurality of drum separators connected in parallel.

It is understood that any number of drum separation stages may be utilized in an implementation of the processes and systems described in this specification, any number of which may be connected in series or in parallel (see FIG. 7). In addition, it is understood that different types of magnetic separation equipment, such as drum separators, high-intensity magnetic filters, and/or wet high-intensity magnetic separators, may be utilized in an implementation of the processes and systems described in this specification, any number and type of which may be connected in series or in parallel.

Figure 8:
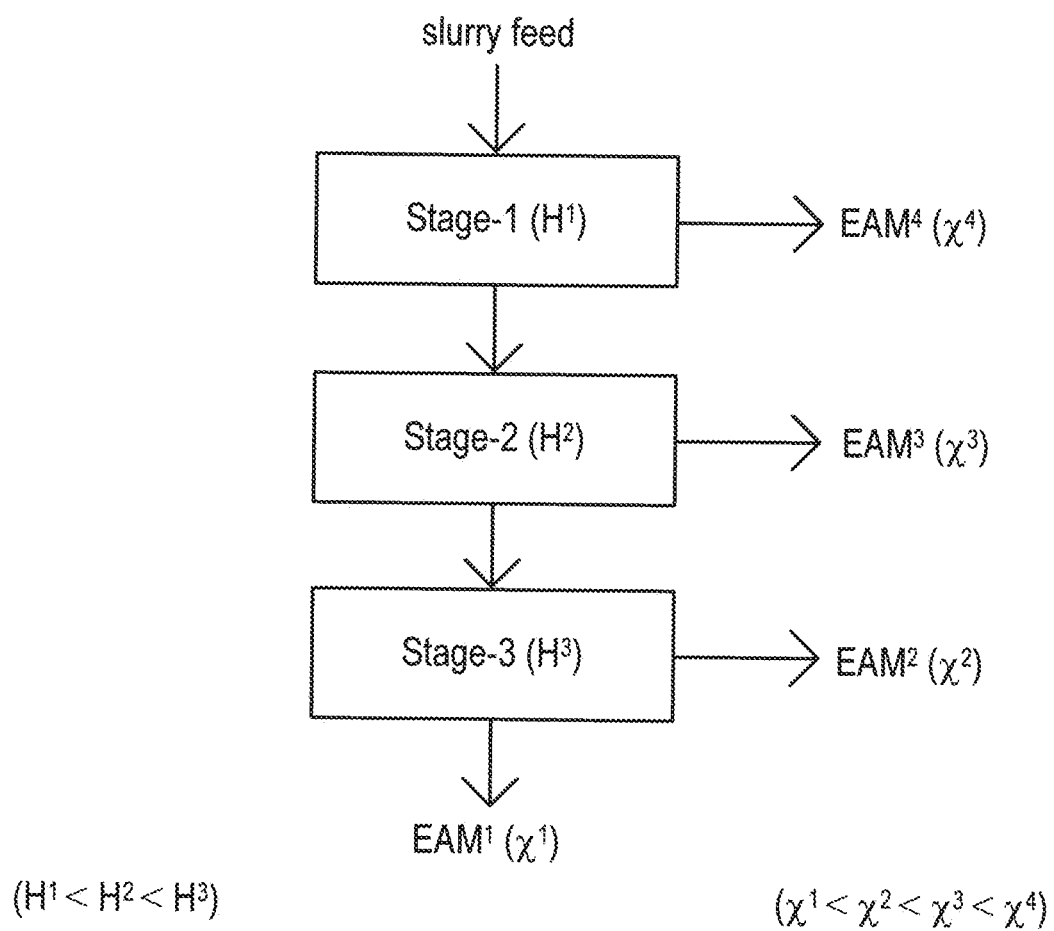
FIG. 8 is a flowchart diagram illustrating a staged magnetic separation of electrode active materials utilizing increasing magnetic field intensities.

The non-limiting embodiments illustrated in FIGS. 4 and 6 utilize staged magnetic separations in which the successive stages utilize successively increased magnetic field intensities to successively separate and concentrate electrode active materials based on successively lower magnetic susceptibility values. This manner of staged operation is generally illustrated in FIG. 8. However, it is understood that various non-limiting embodiments may operate in an opposite fashion, i.e., successive stages utilizing successively decreased magnetic field intensities to successively separate and concentrate electrode active materials based on successively higher magnetic susceptibility values. This manner of staged operation is generally illustrated in FIG. 9.

Referring to FIG. 8, a slurry comprising four electrode active materials ($EAM^1$, $EAM^2$, $EAM^3$, and $EAM^4$) is processed in accordance with various non-limiting embodiments to separate and concentrate the constituent electrode active materials. $EAM^1$ is diamagnetic like graphite, for example. $EAM^2$, $EAM^3$, and $EAM^4$ are paramagnetic like lithium metal compounds and nickel oxyhydroxide, for example, and each electrode active material possesses successively greater magnetic susceptibilities, i.e. $\chi^1 < \chi^2 < \chi^3 < \chi^4$. The slurry is successively fed to three magnetic separation stages, which may be implemented using any suitable combination of magnetic separation equipment. The three successive stages utilize successively higher magnetic field intensities, i.e., $H^1 < H^2 < H^3$. The non-magnetic fraction from Stage-1 and Stage-2 are fed to Stage-2 and Stage-3, respectively. $EAM^4$ (comprising the largest magnetic susceptibility value, $\chi^4$) is separated and concentrated as the magnetic fraction at Stage-1 (comprising the smallest magnetic field intensity, $H^1$). $EAM^3$ (comprising the second largest magnetic susceptibility value, $\chi^3$) is separated and concentrated as the magnetic fraction at Stage-2 (comprising the second smallest magnetic field intensity, $H^2$). $EAM^2$ and $EAM^1$ (comprising the second lowest and the lowest magnetic susceptibility values, respectively, $\chi^2$ and $\chi^1$) are separated and concentrated at Stage-3 (comprising the largest magnetic field intensity $H^3$). $EAM^2$ is concentrated in the magnetic fraction of Stage-3 and $EAM^1$ is concentrated in the non-magnetic fraction of Stage-3.

Figure 9:
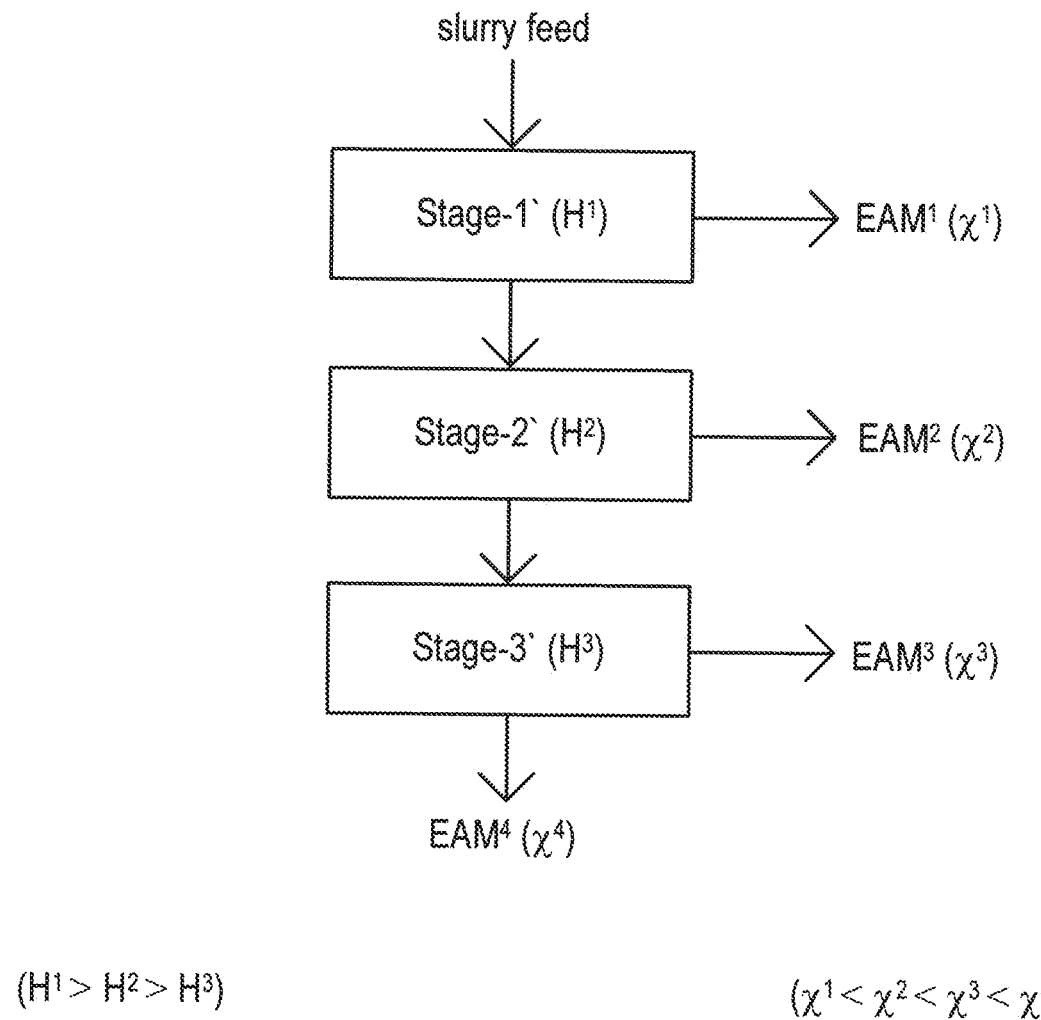
FIG. 9 is a flowchart diagram illustrating a staged magnetic separation of electrode active materials utilizing decreasing magnetic field intensities.

Referring to FIG. 9, a slurry comprising four electrode active materials ($EAM^1$, $EAM^2$, $EAM^3$, and $EAM^4$) is processed in accordance with various non-limiting embodiments to separate and concentrate the constituent electrode active materials. $EAM^1$ is diamagnetic like graphite, for example. $EAM^2$, $EAM^3$, and $EAM^4$ are paramagnetic like lithium metal compounds and nickel oxyhydroxide, for example, and each electrode active material possesses successively greater magnetic susceptibilities, i.e. $\chi^1 < \chi^2 < \chi^3 < \chi^4$. The slurry is successively fed to three magnetic separation stages, which may be implemented using any suitable combination of magnetic separation equipment. The three successive stages utilize successively lower magnetic field intensities, i.e., $H^1 > H^2 > H^3$. The magnetic fraction from Stage-1 and Stage-2 are fed to Stage-2 and Stage-3, respectively. $EAM^1$ (comprising the lowest magnetic susceptibility value, $\chi^1$) is separated and concentrated as the non-magnetic fraction at Stage-1 (comprising the largest magnetic field intensity, $H^1$). $EAM^2$ (comprising the second lowest magnetic susceptibility value, $\chi^2$) is separated and concentrated as the non-magnetic fraction at Stage-2 (comprising the second largest magnetic field intensity, $H^2$). $EAM^3$ and $EAM^4$ (comprising the second highest and the highest magnetic susceptibility values, respectively, $\chi^3$ and $\chi^4$) are separated and concentrated at Stage-3 (comprising the smallest magnetic field intensity $H^3$). $EAM^4$ is concentrated in the magnetic fraction of Stage-3 and $EAM^3$ is concentrated in the non-magnetic fraction of Stage-3.

While FIGS. 8 and 9 illustrate three magnetic separation stages, it is understood that various non-limiting embodiments may utilize one, two, or any number of stages in series and/or in parallel. In addition, it is understood that embodiments comprising a plurality of magnetic separation stages may be implemented in continuous, batch, or semi-batch operational modes using one or more magnetic separation units with or without recycle features. For example, rather than operating a plurality of magnetic separation units in series, a single magnetic separation unit may operate with a recycle feature wherein the magnetic field intensity of the single unit is successively increased or decreased in a step-wise manner between given magnetic separation unit operations.

In various non-limiting embodiments, various operating parameters may be manipulated to maximize the recovery and grade (i.e., concentration) of electrode active materials in the concentrates produced at the various magnetic separation stages. Such operating parameters include, for example, the solids content of the black mass slurry, the composition of the slurry carrier fluid, the composition of the particulate electrode active materials and other constituents of the slurry, the magnetic separation equipment (e.g., high-intensity magnetic filters, wet high-intensity magnetic separators, drum separators, and the like), the magnetic field intensity and magnetic field gradient induced in the respective magnetic separation units, the slurry flowrate through the respective magnetic separation units, the flowrate of wash fluids (e.g., clean carrier fluids) through the respective magnetic separation units, the utilization of recycle streams, and like parameters. The variation of these and like parameters in a given implementation of the processes and systems described in this specification may be performed by persons having ordinary skill in the art in accordance with this specification and without undue experimentation. For example, by simultaneously adjusting the magnetic field intensity, magnetic field gradient, slurry flowrate, and wash fluid flowrate in a given magnetic separation unit, the separation and concentration of select paramagnetic particles may be achieved.

The non-limiting and non-exhaustive examples that follow are intended to further describe various non-limiting and non-exhaustive embodiments without restricting the scope of the embodiments described in this specification.

EXAMPLES

Example-1: Magnetic Susceptibilities of Select Lithium Metal Compounds

Figure 10:
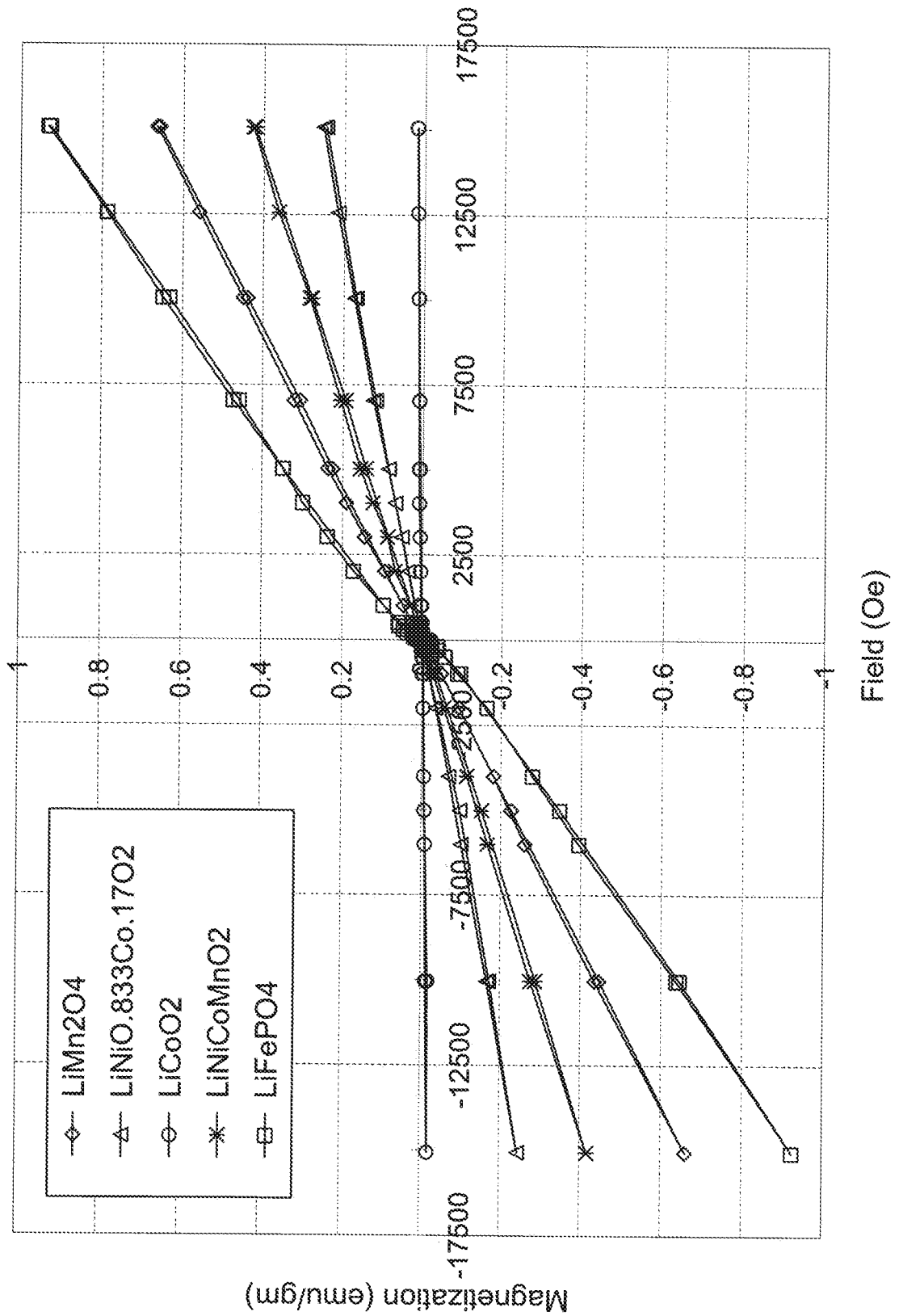
FIGS. 10 and 11 are scatter-plot graphs of induced magnetization versus externally applied magnetic field for various lithium metal compounds.
Figure 11:
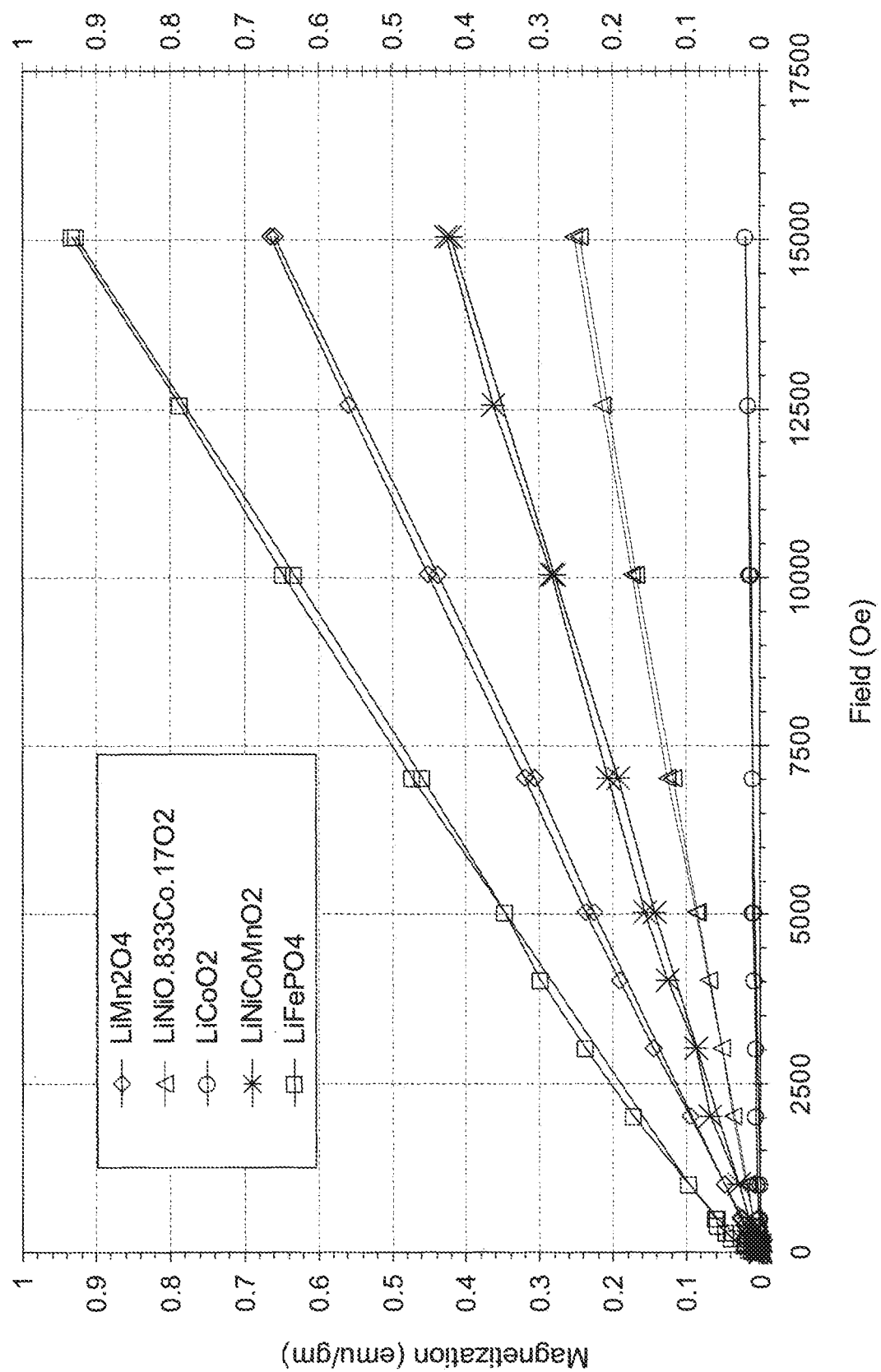

The magnetic susceptibility values of select lithium metal compounds commonly employed in lithium-ion electrochemical cells were determined. The lithium metal compounds $LiCoO_2$, $LiMn_2O_4$, $LiFePO_4$, $LiNiCoMnO_2$, and $LiNiO_{0.833}Co_{0.170}O_2$ were analyzed. The magnetic susceptibilities were determined by measuring the mass magnetizations ($M_m$ [emu/gram], i.e., the net magnetic dipole moments per unit mass) induced in samples of the lithium metal compounds when placed in various magnetic field intensities (H [Oersteds]). The magnetizations were measured using a superconducting quantum interface device (SQUID) magnetometer. The resulting magnetization versus magnetic field intensity data was plotted for each lithium metal compound, as shown in FIGS. 10 and 11. Least squares linear regression analysis was used to fit the data for each lithium metal compound with a linear best fit curve. The mass magnetic susceptibility ($\chi_m$ [emu/gm-Oe]) of each lithium metal compound was calculated as the slope of the respective linear best fit curves, in accordance with the magnetization formula:

$$M_m = \chi_m H$$

Figure 12:
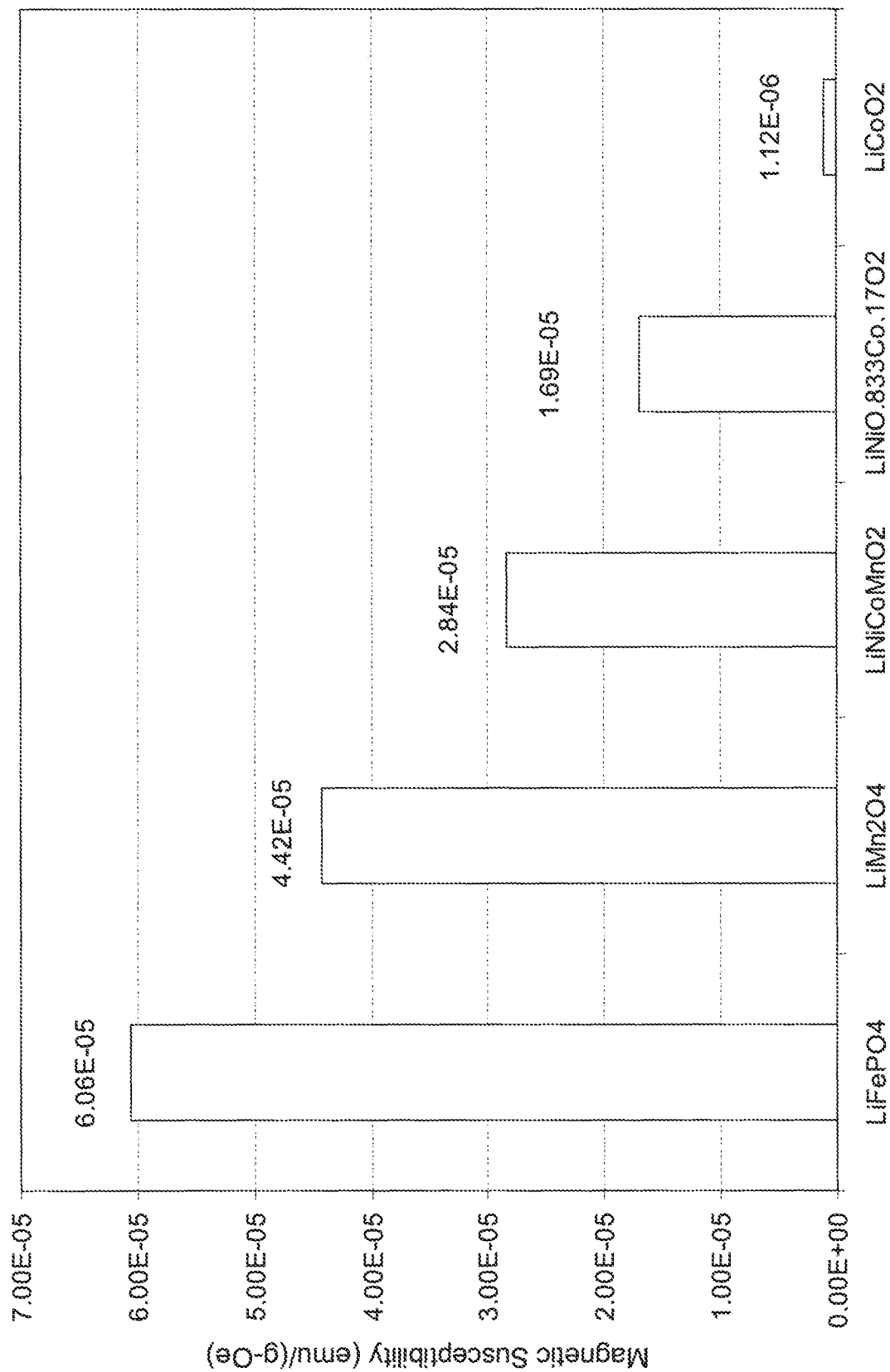
FIG. 12 is a bar graph of magnetic susceptibility values for various lithium metal compounds.
Figure 13:
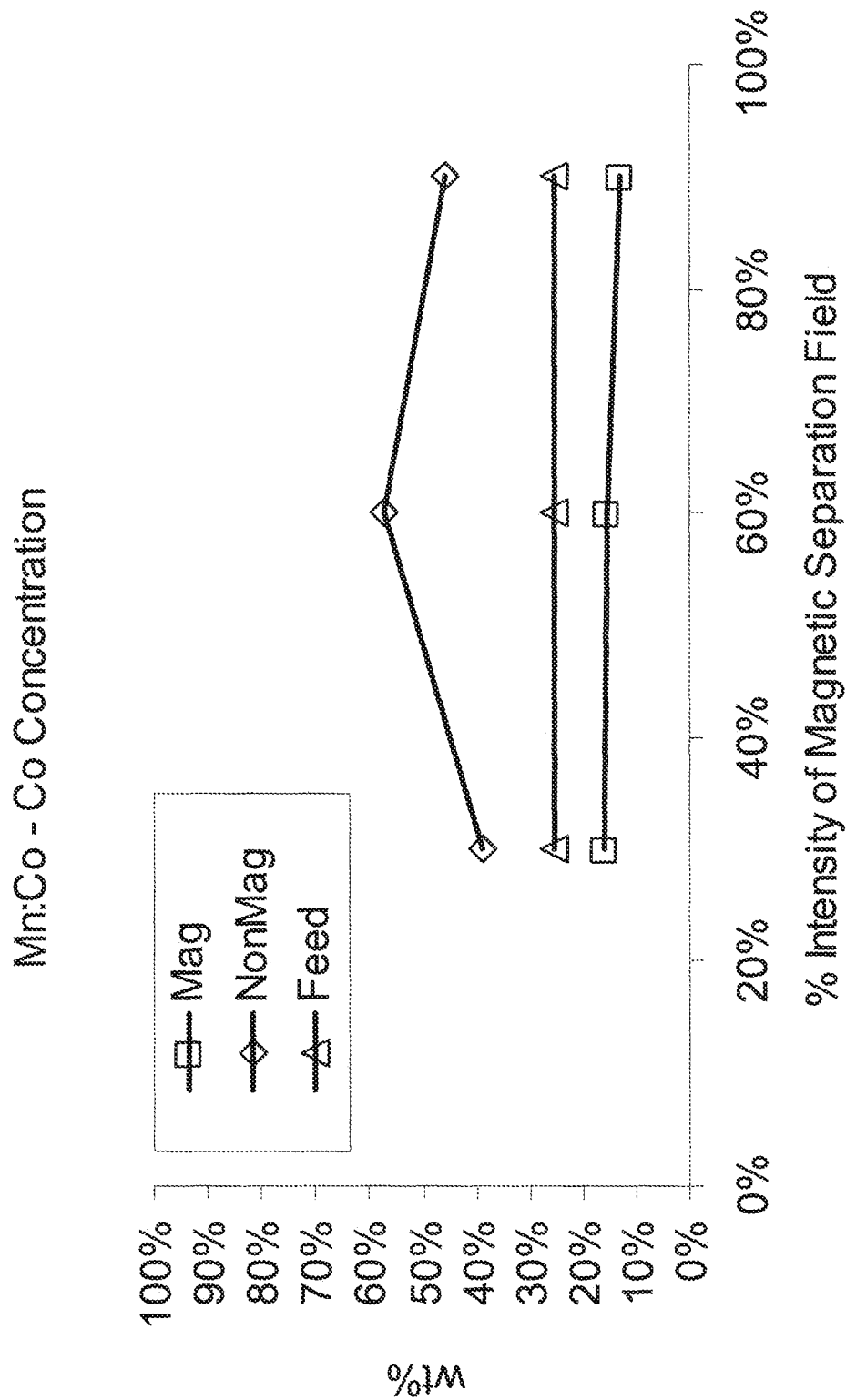
FIGS. 13 through 20 are scatter-plot graphs of material concentrations and recoveries versus percentage intensity of magnetic separation field for test separations of lithium metal compounds in accordance with Example 2.
Figure 14:
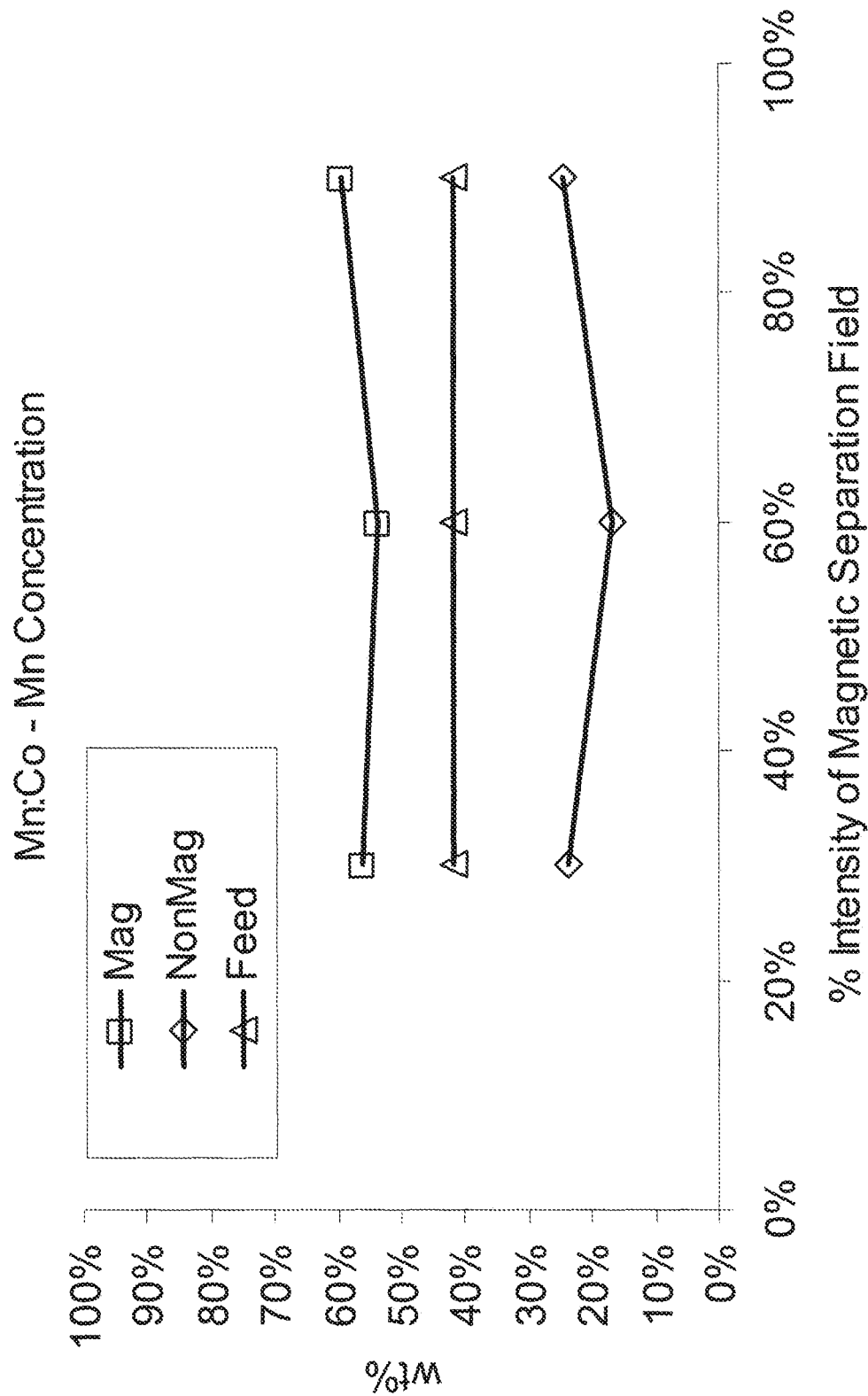
Figure 15:
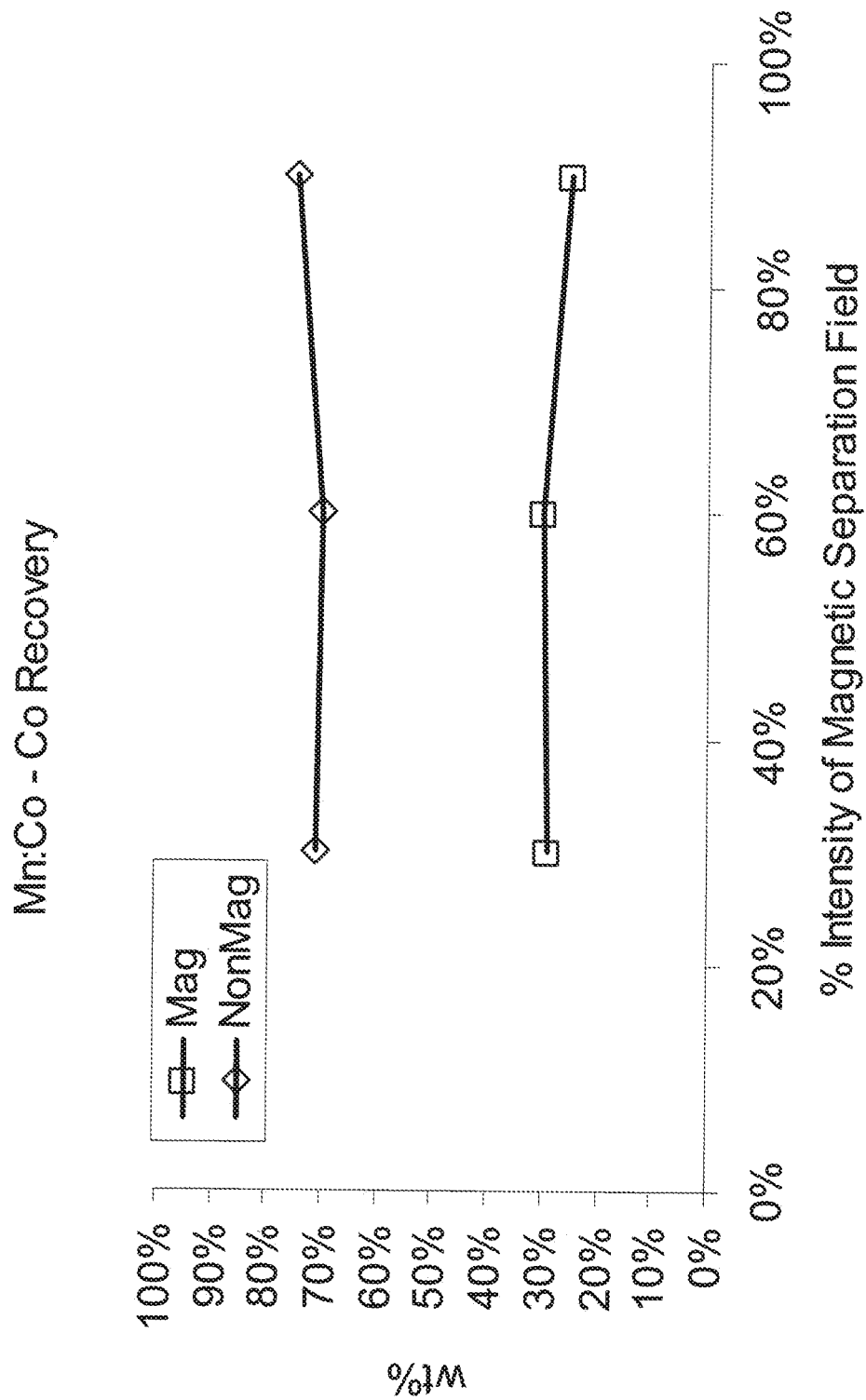
Figure 16:
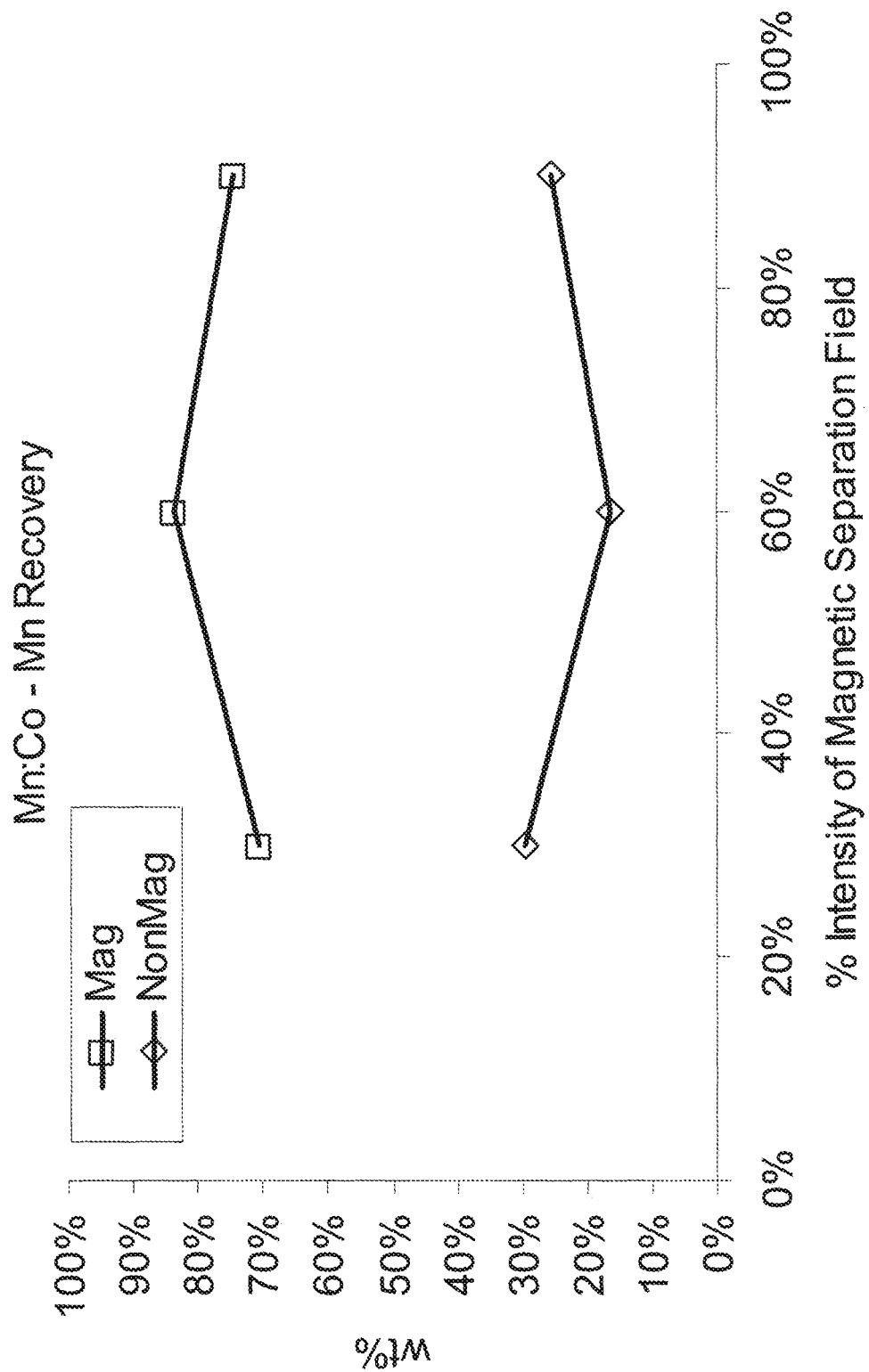
Figure 17:
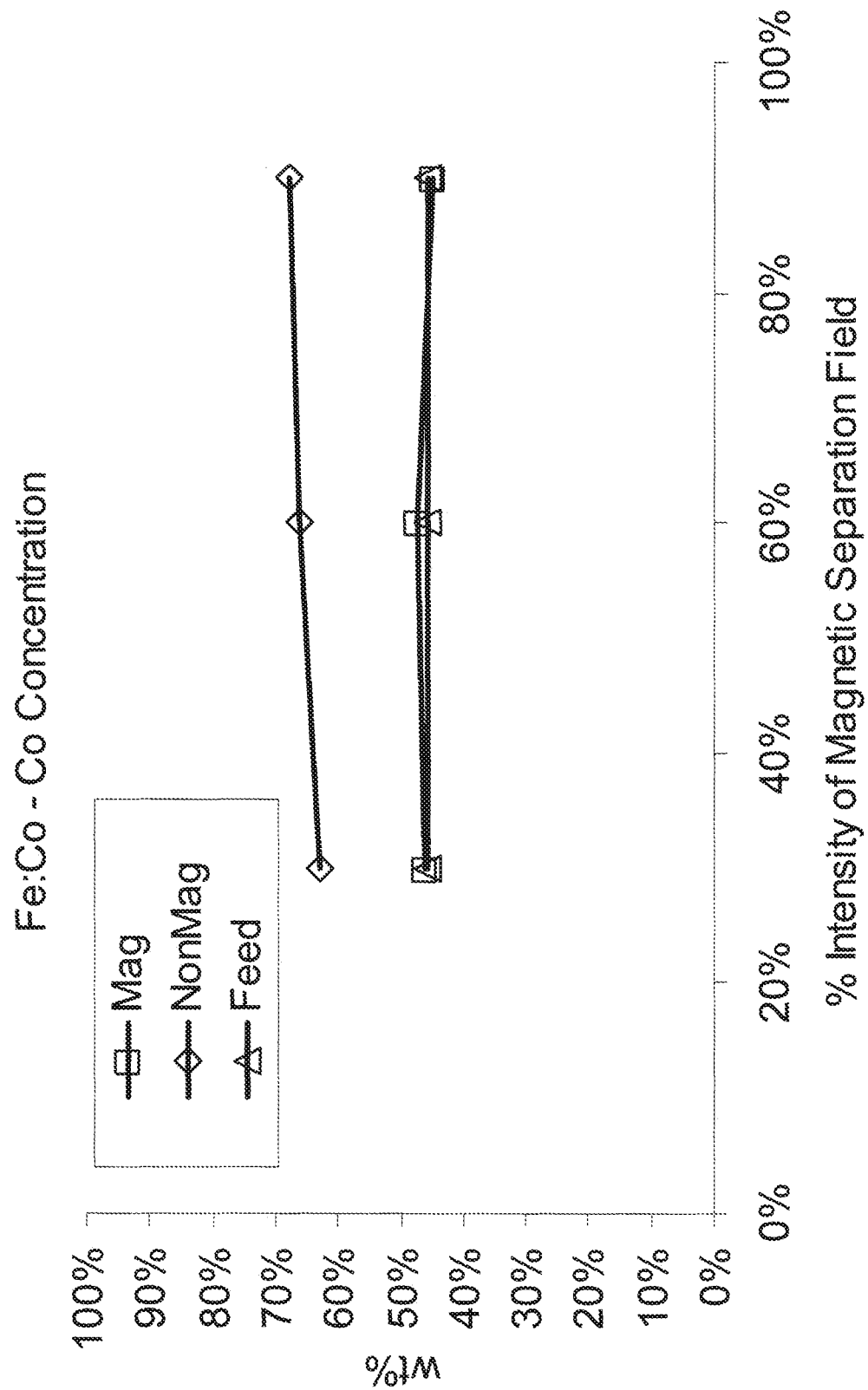
Figure 18:
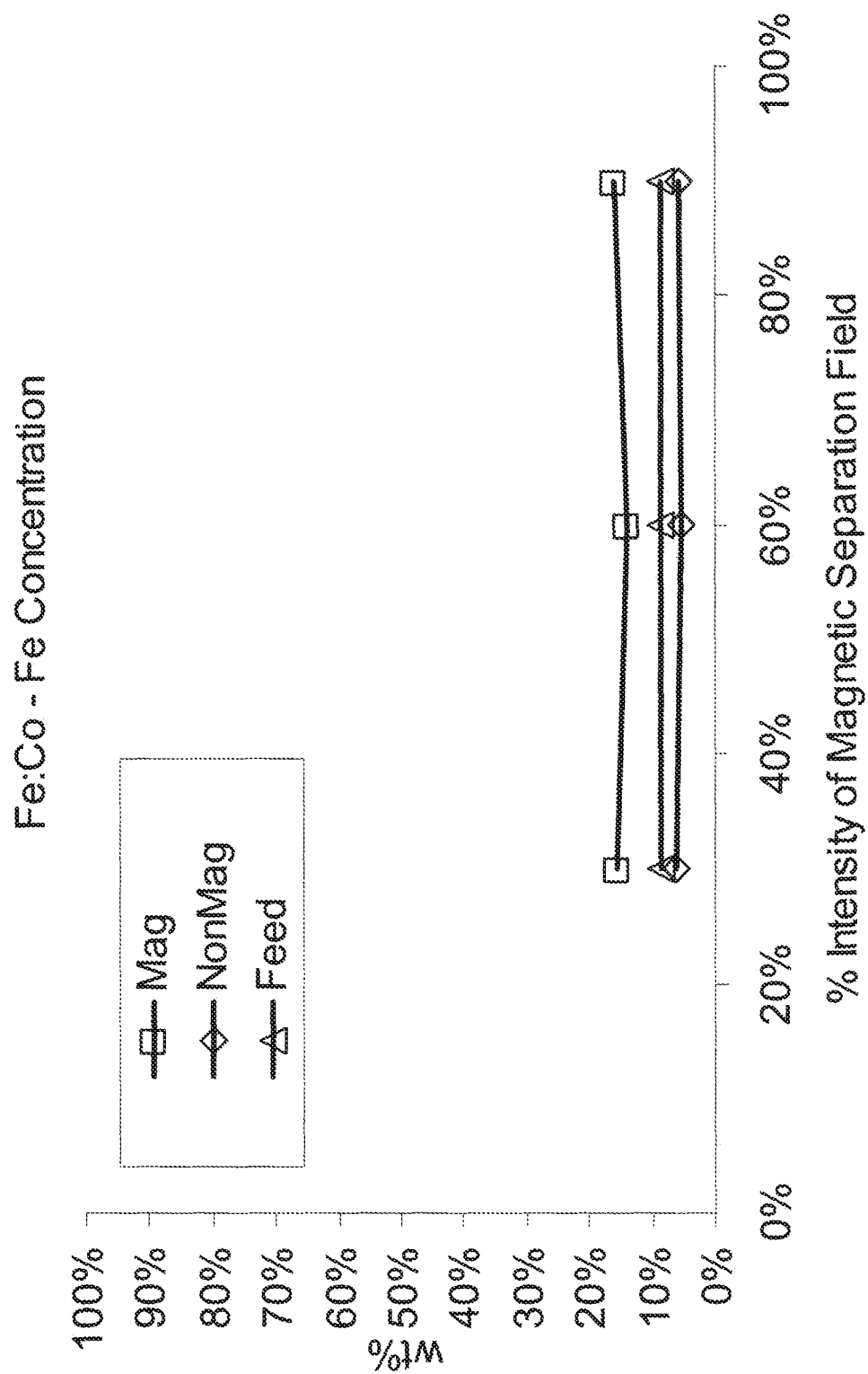
Figure 19:
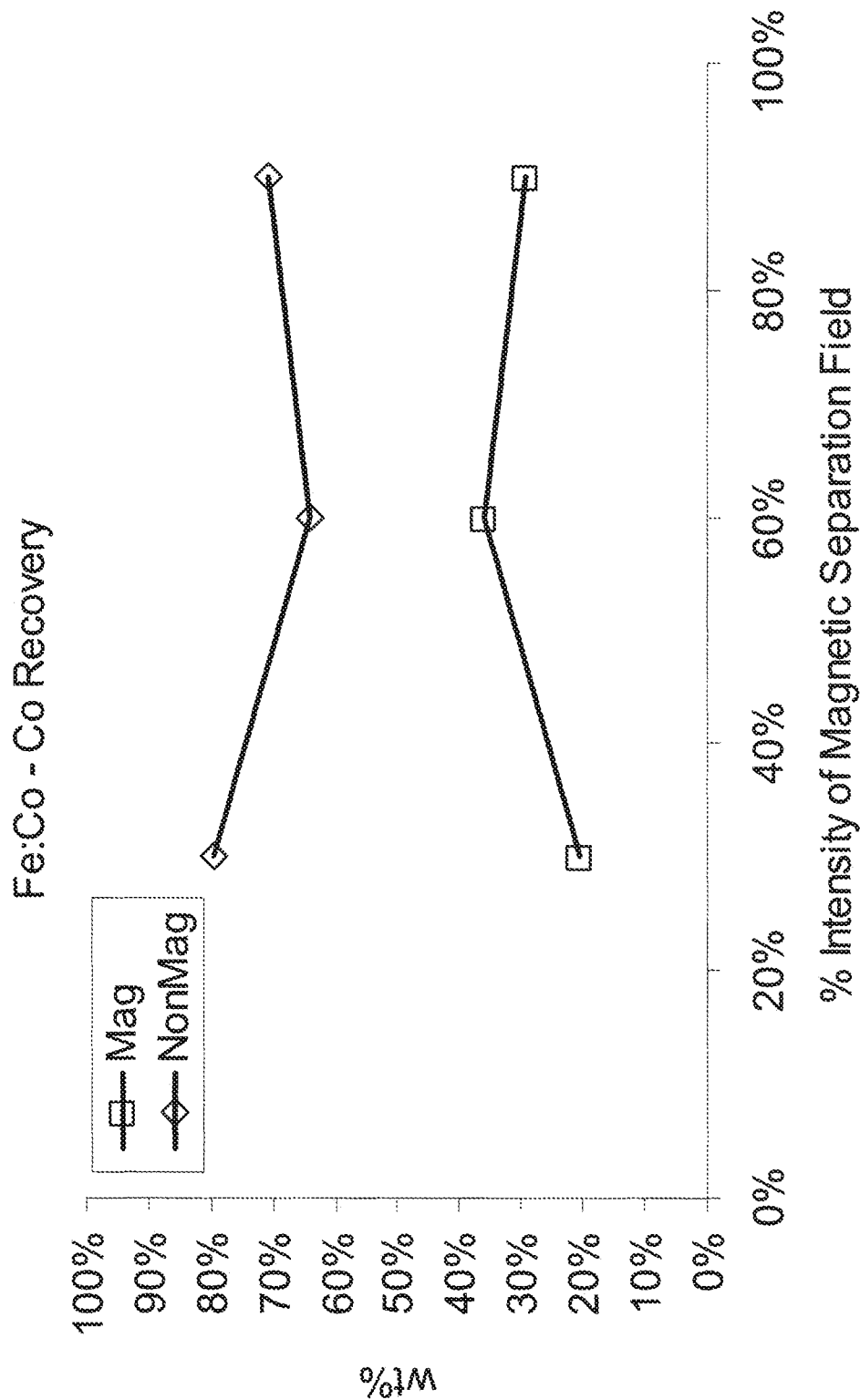
Figure 20:
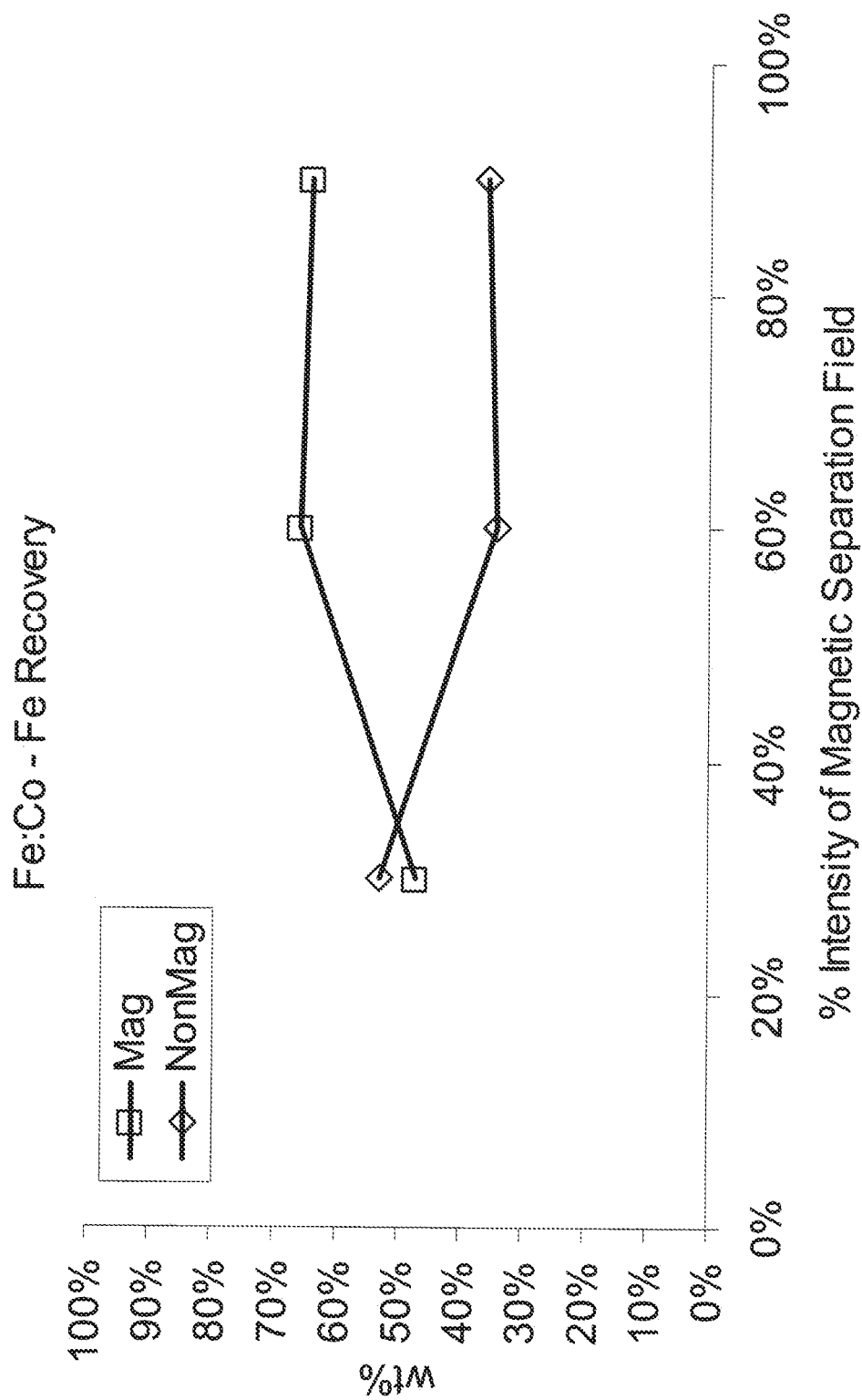
Figure 21:
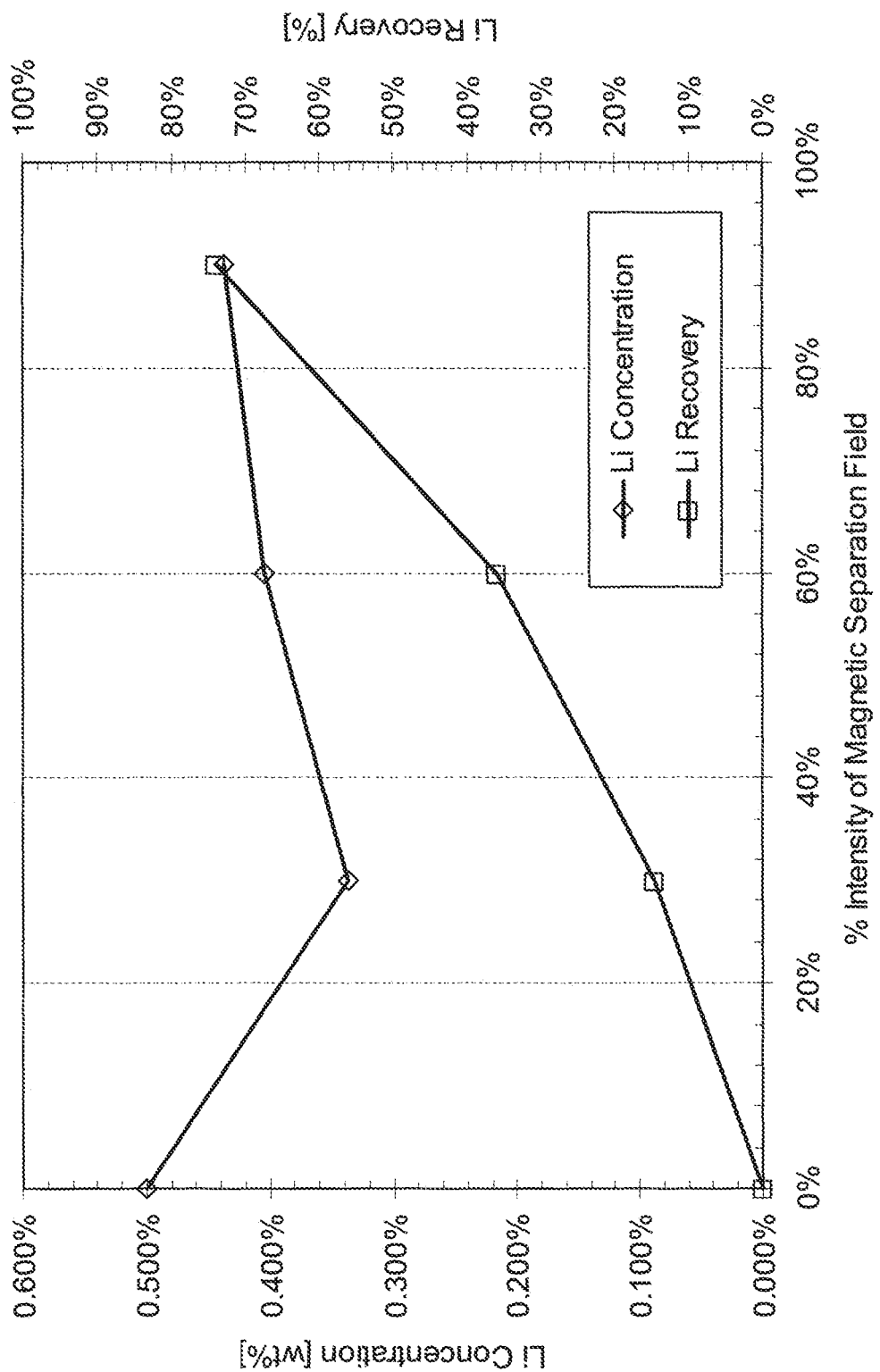
FIGS. 21 through 25 are scatter-plot graphs of material concentrations and recoveries versus percentage intensity of magnetic separation field for test separations of electrode active materials obtained from a prismatic pouch lithium-ion battery.
Figure 22:
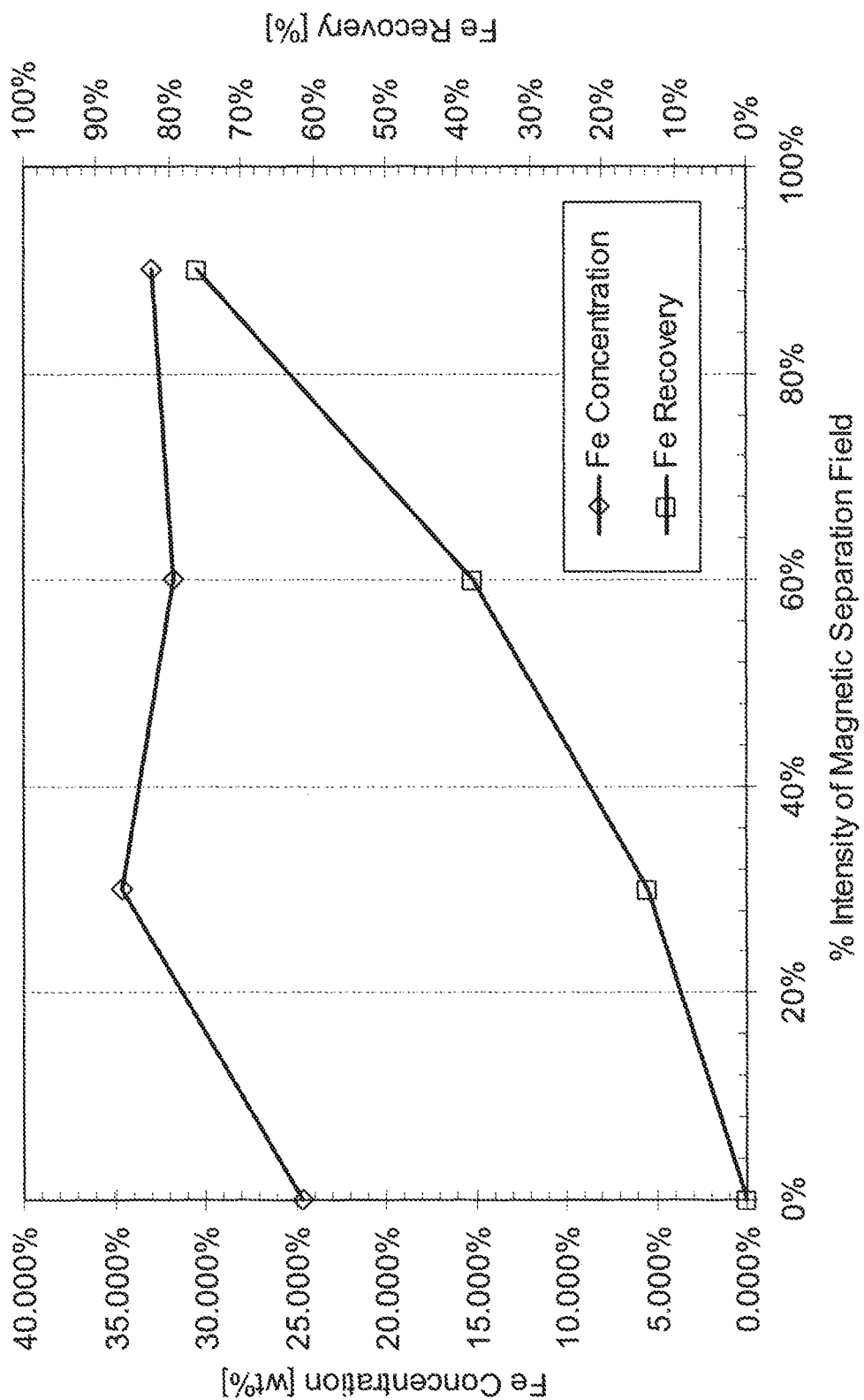
Figure 23:
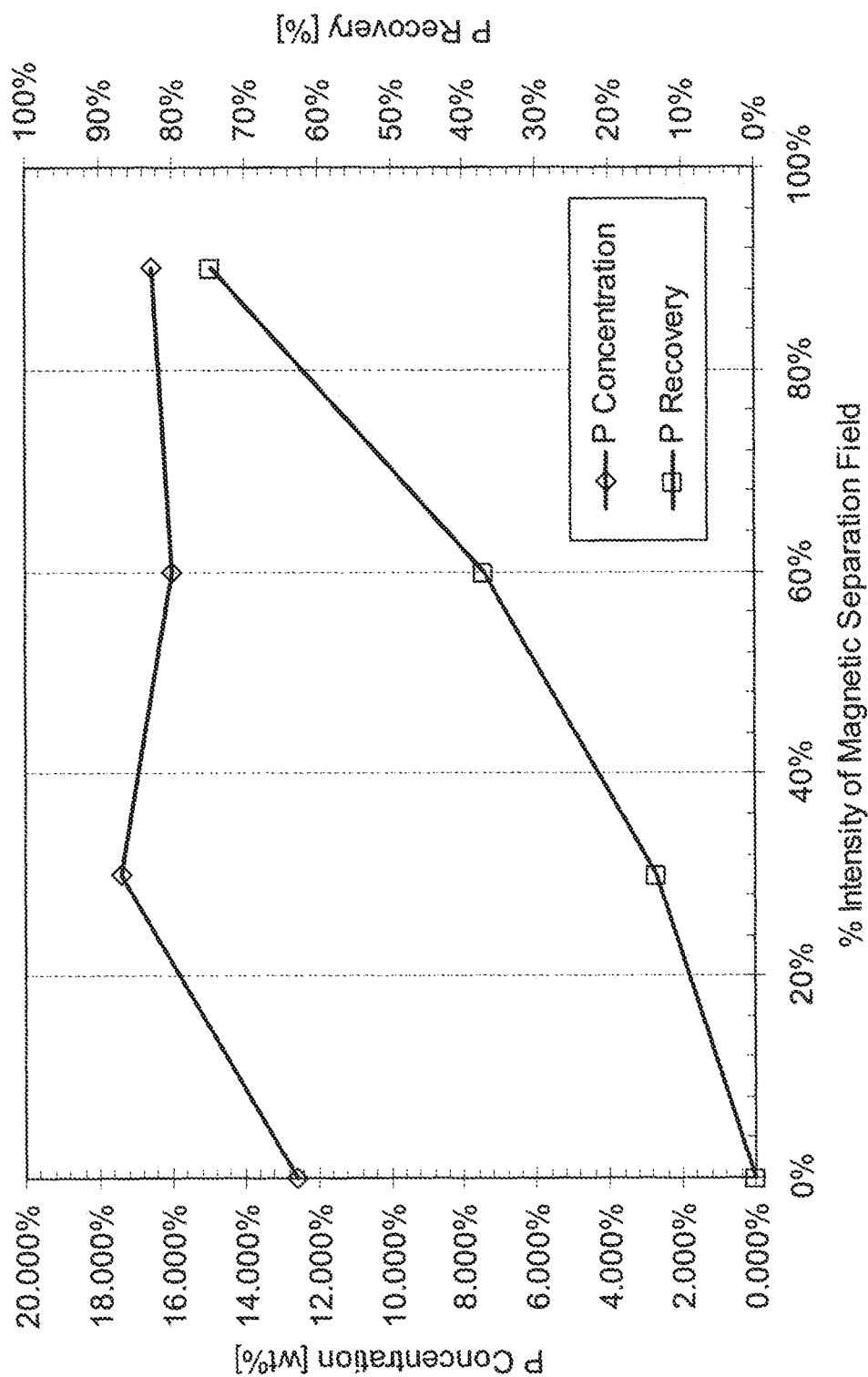
Figure 24:
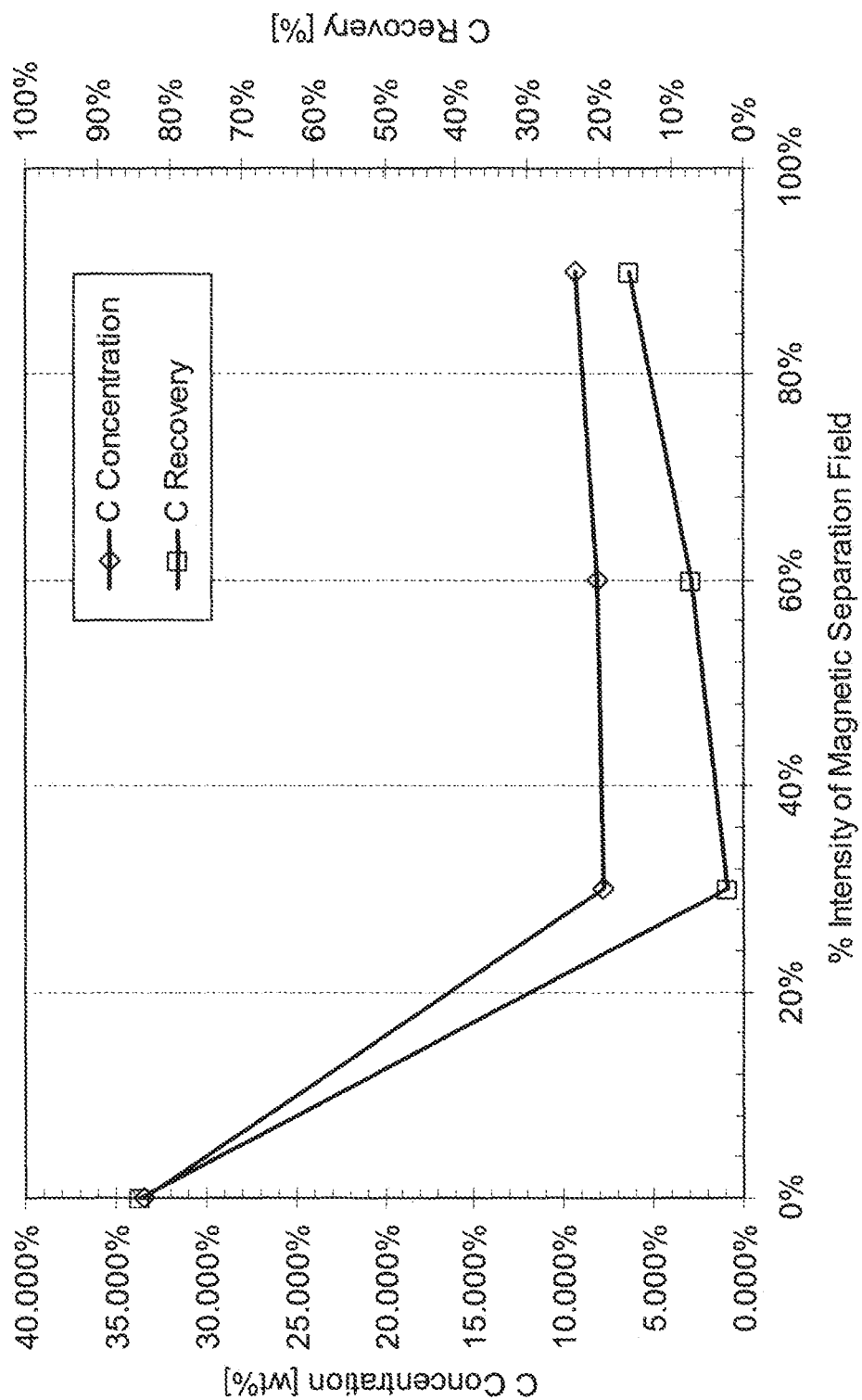
Figure 25:
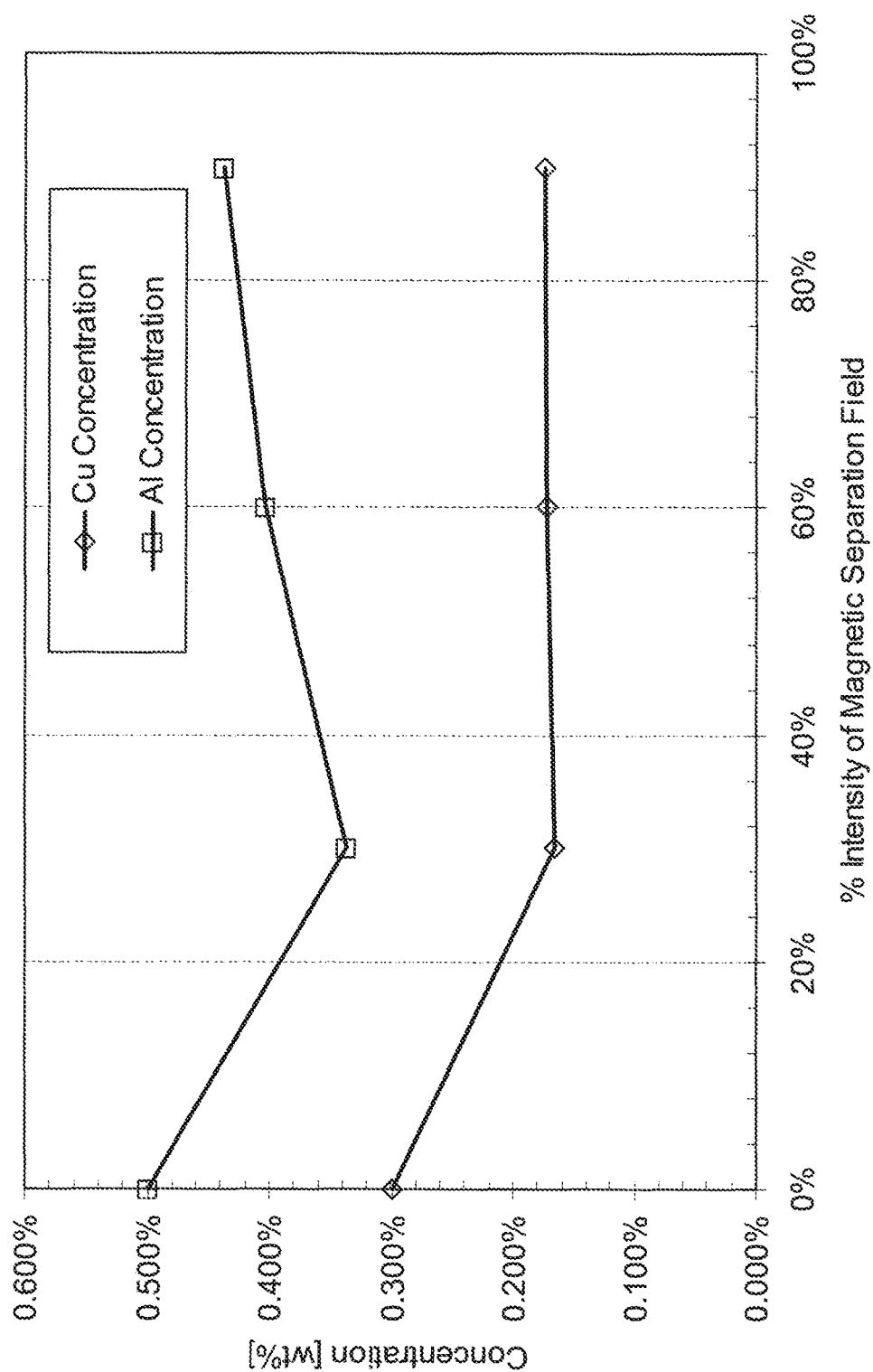

The magnetic susceptibilities are reported in Table 2 and FIG. 12.

TABLE 2

| Lithium metal compound | ($\chi_m$ [m$^3$/kg]) | ($\chi_m$ [emu/gm-Oe]) |
|---|---|---|
| $LiFePO_4$ | 4.82 × 10−3 | 6.064 × 10$^{-5}$ |
| $LiMn_2O_4$ | 3.52 × 10−3 | 4.419 × 10$^{-5}$ |
| $LiNiCoMnO_2$ | 2.26 × 10−3 | 2.842 × 10$^{-5}$ |
| $LiNiO_{0.833}Co_{0.170}O_2$ | 1.34 × 10−3 | 1.690 × 10$^{-5}$ |
| $LiCoO_2$ | 8.91 × 10−5 | 1.124 × 10$^{-6}$ |

As shown in FIG. 12, the magnetic susceptibilities of each lithium metal compound are sufficiently different to facilitate the magnetic separation, isolation, and concentration of each individual lithium metal compound from a mixed black mass slurry comprising multiple different lithium metal compounds.

The procedure outlined in this Example for determining the magnetic susceptibilities of select lithium metal compounds may be used without undue experimentation to determine the relative magnetic susceptibilities of other paramagnetic constituents of black mass materials isolated from mixed scrap electrochemical cells. This will allow for the design of magnetic separation, isolation, and concentration processes for additional constituents in accordance with the processes and systems described in this specification and without undue experimentation.

Example-2: Select Lithium Metal Compound Test Separations

The lithium metal compounds analyzed in Example 1 were used to perform test separations utilizing an Eriez L-4-20 High Intensity Wet Magnetic Separator (Eriez Manufacturing Company, Erie, Pa., USA). The Eriez L-4-20 comprises two electromagnetic coils in an opposed orientation across a stainless steel separation box. The opposed coils provide magnetic poles between which a magnetic field is established upon energizing the coils such that the magnetic field is located within the separation box. A magnetic flux-converging matrix is positioned within the separation box to intensify the magnetic field gradient within the separation box and function as an active magnetic surface to which magnetized particles are pinned during a separation. The magnetic flux-converging matrix may comprise an expanded metal material similar to a steel wool material. The Eriez L-4-20 uses standard expanded metal flux-converging matrices such as, for example, coarse grid (½ inch #13 gauge) and medium grid (¼ inch #18 gauge). Coarse grid will handle feeds with particle sizes as great as 20 mesh. Medium grid should be used with particles of 30 mesh or smaller particle sizes.

The Eriez L-4-20 separation box comprises inlet and outlet ports for the flow of slurry through the separation box during operation. The Eriez L-4-20 operates by flowing a slurry through the separation box and the magnetic flux-converging matrix with the magnetic coils energized. The magnetic field established in the separation box magnetizes the magnetic flux-converging matrix intensifying the magnetic field gradient within the separation box. Ferromagnetic particles in a slurry flowing through the separation box are separated from the slurry by magnetic force between the particles and the active magnetic surface provided by the magnetic flux-converging matrix. The separated particles collect in the magnetic flux-converging matrix during operation and non-magnetic particles are carried through the separation box and the magnetic flux-converging matrix by fluid drag forces in the slurry flow. The particles collected in the magnetic flux-converging matrix are flushed out of the separation box by flowing water through the separation box after discontinuing the slurry flow and de-energizing the electromagnetic coils.

Depending on the intensity of the magnetic field established in the separation box and the magnetic susceptibility values of paramagnetic materials comprising a slurry, paramagnetic particles may also be magnetized and pinned to the active magnetic surface provided by the magnetic flux converging matrix in the Eriez L-4-20. This capability was used to perform two test separations: (i) a separation of a mixture of reagent grade $LiCoO_2$ and reagent grade $LiMn_2O_4$; and (ii) a separation of a mixture of reagent grade $LiCoO_2$ and reagent grade $LiFePO_4$.

$LiCoO_2$ powder was mixed with $LiMn_2O_4$ and $LiFePO_4$ powders, respectively, at one-to-one (1:1) volumetric ratios. The $LiCoO_2$—$LiMn_2O_4$ powder mixture and the $LiCoO_2$—$LiFePO_4$ powder mixture were used to form aqueous slurries comprising the lithium metal compounds at a 5% solid content by mass by hand mixing under ambient conditions. The aqueous slurries were double-passed through the Eriez L-4-20 operating at 30%, 60%, and 90% of maximum magnetic field intensity, respectively. A #18 gauge medium grid expanded metal mesh was used as the magnetic flux-converging matrix for the test separations. The first passes separated the constituent particles into magnetic fractions (which were pinned to the magnetic flux-converging matrix) and non-magnetic fractions (which passed through with the slurry) at the predetermined magnetic field intensities. The non-magnetic fractions from the first passes were fed through the Eriez L-4-20 for second passes. After the second passes, the Eriez L-4-20 was de-energized and the magnetic fractions were collected with a water flush. A water flush was also used in between the first passes and the second passes (while the Eriez L-4-20 was energized) to ensure that any entrained non-magnetic particles were removed from the first pass magnetic fraction.

The weight percentage recovery and concentration of the cobalt and either manganese or iron, as applicable, were calculated for the magnetic and non-magnetic fractions for each slurry separated using the Eriez L-4-20 operating at 30%, 60%, and 90% of maximum magnetic field intensity (approximately 0.6 Tesla, 1.2 Tesla, and 1.8 Tesla, respectively). The weight percentage recoveries were also calculated for the entire lithium metal compounds. The weight percentage recoveries and concentrations were calculated with data obtained using inductively-coupled plasma atomic emission spectroscopy (ICP-AES). The results are reported in Tables 3 and 4 and FIGS. 13-20.

TABLE 3

| Feed | Sample Fraction | Mag Field Intensity | Element weight percentage concentration and percentage increase/decrease relative to feed | | | | | | | |
|---|---|---|---|---|---|---|---|---|---|---|
| | | | Li | +/−Li | Co | +/−Co | Mn | +/−Mn | Fe | +/−Fe |
| $LiMn_2O_4$ + $LiCoO_2$ | Feed | — | 7.00 | — | 25.30 | — | 42.00 | — | — | — |
| | Mag | 90% | 5.45 | −22.19 | 12.72 | −49.72 | 59.22 | 41.01 | — | — |
| | Non-mag | 90% | 7.13 | 1.85 | 45.77 | 80.92 | 24.48 | −41.72 | — | — |
| | Feed | — | 7.00 | — | 25.30 | — | 42.00 | — | — | — |
| | Mag | 60% | 5.43 | −28.87 | 15.25 | −65.86 | 53.83 | 21.97 | — | — |
| | Non-mag | 60% | 7.65 | 9.24 | 57.30 | 126.48 | 16.77 | −60.08 | — | — |
| | Feed | — | 7.00 | — | 25.30 | — | 42.00 | — | — | — |
| | Mag | 30% | 5.60 | −20.01 | 15.78 | −37.62 | 56.11 | 33.59 | — | — |
| | Non-mag | 30% | 6.30 | −10.01 | 38.85 | 53.54 | 23.60 | −43.81 | — | — |
| $LiFePO_4$ + $LiCoO_2$ | Feed | — | 6.45 | — | 45.81 | — | — | — | 8.46 | — |
| | Mag | 90% | 7.26 | 12.65 | 44.88 | −2.04 | — | — | 16.15 | 90.74 |
| | Non-mag | 90% | 8.51 | 32.00 | 67.93 | 48.28 | — | — | 5.63 | −33.48 |
| | Feed | — | 6.45 | — | 45.81 | — | — | — | 8.46 | — |
| | Mag | 60% | 7.26 | 12.65 | 47.29 | 3.22 | — | — | 13.77 | 62.71 |
| | Non-mag | 60% | 8.51 | 32.00 | 66.13 | 44.35 | — | — | 5.53 | −34.66 |
| | Feed | — | 6.45 | — | 45.81 | — | — | — | 8.46 | — |
| | Mag | 30% | 7.41 | 14.89 | 46.10 | 0.63 | — | — | 15.46 | 82.60 |
| | Non-mag | 30% | 8.47 | 31.39 | 63.16 | 37.87 | — | — | 6.15 | −27.35 |

TABLE 4

| Feed | Sample Fraction | Mag Field Intensity | Recovery (weight percentage) | | |
|---|---|---|---|---|---|
| | | | $LiMn_2O_4$ | $LiCoO_2$ | $LiFePO_4$ |
| $LiMn_2O_4$ + $LiCoO_2$ | Feed | — | 100.00 | 100.00 | 100.00 |
| | Mag | 90% | 74.43 | 25.06 | — |
| | Non-mag | 90% | 7.45 | 74.94 | — |
| | Feed | — | 100.00 | 100.00 | 100.00 |
| | Mag | 60% | 83.79 | 30.01 | — |
| | Non-mag | 60% | 7.39 | 69.99 | — |
| | Feed | — | 100.00 | 100.0 0 | 100.00 |
| | Mag | 30% | 70.34 | 28.84 | — |
| | Non-mag | 30% | 7.92 | 71.16 | — |
| $LiFePO_4$ + $LiCoO_2$ | Feed | — | 100.00 | 100.00 | 100.00 |
| | Mag | 90% | — | 29.22 | 64.19 |
| | Non-mag | 90% | — | 70.78 | 35.81 |
| | Feed | — | 100.00 | 100.00 | 100.00 |
| | Mag | 60% | — | 35.82 | 66.03 |
| | Non-mag | 60% | — | 64.18 | 33.97 |
| | Feed | — | 100.00 | 100.00 | 100.00 |
| | Mag | 30% | — | 20.55 | 47.11 |
| | Non-mag | 30% | — | 79.45 | 52.89 |

As shown in Tables 3 and 4, and FIGS. 13-20, good separation and concentration of the lithium metal compounds was achieved using the different magnetic susceptibility values of the respective materials.

Example-3: Battery Electrode Active Material Test Separation

A magnetic separation using an Eriez L-4-20 High Intensity Wet Magnetic Separator (Eriez Manufacturing Company, Erie, Pa., USA) was performed using the electrode active materials of prismatic pouch lithium-ion cells (AMP20™, A123 Systems, Inc., Waltham, Mass., USA). The mass and dimensions of the cells were measured and averaged 491 grams and 8.9 inches by 6.4 inches by 0.65 inches. The cells were examined with a voltmeter to determine the electrical potential of the cells. A resistor was clamped to the leads of each cell for a period of time to ensure full electrical discharge. The cells were placed in a hermetically sealed glove box and purged with nitrogen for 4 hours to ensure the removal of oxygen from the glove box.

In the resulting inert atmosphere in the glove box, two prismatic pouch cells were disassembled by hand. Three edges of the cell pouch (top, right side, and bottom) were cut using knife taking care to not cut into the anodes or cathodes. The cathode comprised a lithium iron phosphate active material on an aluminum current collecting plate. The anode comprised graphite on a copper current collecting plate. The electrolyte comprised an ethylene-carbonate based carrier fluid, which evaporated during disassembly. The anodes and cathodes were peeled from the separator sheets, cut from the electrical leads, removed, and stored in separate containers.

The anodes and cathodes were washed with isopropyl alcohol after separation from the pouch cells to remove residual electrolyte and carrier fluid. The anodes and cathodes were then washed with water. The masses and dimensions of the anode sheets were measured and averaged 9.5 grams and 7.65 inches by 5.875 inches per sheet. The masses and dimensions of the cathode sheets were measured and averaged 6.7 grams and 7.75 inches by 5.875 inches per sheet. The average total mass of the anodes was 202.0 grams, and the average total mass of the cathodes was 175.5 grams, per pouch cell. The aluminized pouch, tabs, and separator sheets had a mass of 54.3 grams. The total mass of the disassembled pouch cell was measured at 429.3 grams. The difference in masses between a disassembled pouch and an intact pouch may be due to the removal of electrolyte and electrolyte carrier fluid, which typically takes up about 12%-14% of the total mass of a prismatic pouch type lithium-ion cell. These data are reported in Table 5.

trode active materials (comprising graphite anode active materials and lithium iron phosphate cathode active material) from the aluminum and copper components of the electrodes. The electrode active materials were screened through a 40-mesh screen to remove aluminum and copper particulate contaminants from the shredding and grinding/milling operations. The resulting anode and cathode black mass materials were washed with de-ionized water.

The separately processed anode and cathode black mass materials were mixed in a 1.0-to-2.5 anode-to-cathode material ratio. Approximately 94 grams of the mixed black mass material and 630 grams of de-ionized water were used to make a 15% solids content slurry. The slurry was magnetically separated using the Eriez L-4-20 operating at 30%, 60%, and 90% of maximum magnetic field intensity (approximately 0.6 Tesla, 1.2 Tesla, and 1.8 Tesla, respectively). A #18 gauge medium grid expanded metal mesh was used as the magnetic flux converging matrix for the test separation. The test separation was designed to sequentially separate the strongest to weakest magnetically susceptible particles. In this manner, ferromagnetic materials would not obstruct the mesh and/or entrain non-magnetic particles in the magnetic fraction.

Initially, the slurry was fed to the magnetic separator operating at 30% magnetic field intensity to pin any ferromagnetic and strongly paramagnetic particles to the magnetic flux converging matrix, thereby separating the magnetized particles from the slurry using the magnetic force between the magnetized particles and an active magnetic surface in contact with the slurry. The non-magnetic fraction passed through the separation box and was collected in a container. After thoroughly rinsing the pinned magnetic fraction with excess water, the collection container was changed, the coils de-energized, and the magnetic field removed. The pinned magnetic fraction captured by the 30%

TABLE 5

| | WHOLE (Average Values) | | | |
|---|---|---|---|---|
| | Mass | Dimensions (in) | | |
| | g | Height | Width | Depth |
| Pouch | 491 | 8.9 | 6.4 | 0.55 |

| | DISASSEMBLED | | | | | |
|---|---|---|---|---|---|---|
| | Mass | Proportion | Dimensions (in) | | x1 Sheet | Approx. # of Sheets |
| | g | % | Height | Width | g | per pouch* |
| Anode | 202.0 | 41.1% | 7.625 | 5.875 | 9.5 | 21 |
| Cathode | 175.5 | 35.7% | 7.75 | 5.875 | 6.7 | 26 |
| Pouch and Separator | 54.3 | 11.1% | | | | |
| Electrolyte Amnt Calcd | 59.2 | 12.1% | | | | |
| Calc Sum | 491.0 | 100.0% | | | | |

*Based on Weight

The isolated anodes and cathodes were processed separately but identically. Each electrode sheet was shredded using a standard paper shredder. The shredded electrodes were ground in a standard food processor. These devices provided laboratory-scale operation similar to pilot-scale or full-scale operation of a knife mill or slitter mill and a pebble mill or ball mill, respectively. The shredding and grinding/milling process liberated approximately 75% of the elecintensity field was washed out of the magnetic flux converging matrix and separation box with de-ionized water and the first magnetic fraction was saved for further analysis.

In like manner, the non-magnetic fraction from the first (30% field intensity) pass was fed through the magnetic separator operating at 60% magnetic field intensity, which resulted in a second magnetic fraction and a second non-magnetic fraction. Again, in like manner, the non-magnetic fraction from the second (60% field intensity) pass was fed through the magnetic separator operating at 90% magnetic field intensity, which resulted in a third magnetic fraction and a third non-magnetic fraction. Accordingly, the test separation produced a total of four test fractions: three magnetic fractions corresponding to 30%, 60%, and 90% field intensity, respectively, and a non-magnetic fraction corresponding to the third non-magnetic fraction that passed through the separator at 90% field intensity. The weight percentage recovery and concentration of the lithium, iron, phosphorus, and carbon was calculated for the four test fractions. The results are reported in Tables 6-8 and FIGS. 21-25 and showed a staged or cumulative separation and concentration of the anode and cathode active materials.

TABLE 6

| Sample # | Description | Weight grams | Amount wt % | Concentrations [wt %] | | | | | |
|---|---|---|---|---|---|---|---|---|---|
| | | | | Al | Cu | Fe | Li | P | C |
| 822 | Anode: Cu - Carbon | 26.8 | 28.5 | 0.35 | 0.64 | 0.09 | 0.00 | 0.77 | 100.00 |
| 823 | Cathode: Al—LiFePO$_4$ | 67.2 | 71.5 | 0.36 | 0.14 | 34.08 | 2.37 | 16.96 | 7.04 |
| | Mixed Feed | 94 | 100.0 | 0.36 | 0.28 | 24.39 | 1.70 | 12.34 | 33.54 |
| 824 | 30% Magnetic | 9.2 | 9.82 | 0.34 | 0.17 | 34.64 | 2.70 | 17.41 | 7.80 |
| 825 | 60% Magnetic | 18.3 | 19.53 | 0.44 | 0.18 | 30.28 | 1.99 | 15.26 | 8.37 |
| 826 | 90% Magnetic | 25.8 | 27.53 | 0.47 | 0.18 | 34.20 | 2.52 | 17.10 | 10.59 |
| 827 | Non-Magnetic | 40.4 | 43.12 | 0.68 | 0.35 | 13.63 | 1.10 | 7.48 | 65.04 |
| | Calculated Mixed Feed | 93.7 | 100.00 | 0.54 | 0.25 | 24.61 | 1.82 | 12.62 | 33.36 |

TABLE 7

| Sample # | Description | Weight grams | Amount wt % | Cumulative Amount [grams] | | | | | |
|---|---|---|---|---|---|---|---|---|---|
| | | | | Al | Cu | Fe | Li | P | C |
| 822 | Anode: Cu - Carbon | 26.8 | 28.5 | 0.095 | 0.172 | 0.025 | 0.000 | 0.207 | 26.800 |
| 823 | Cathode: Al—LiFePO4 | 67.2 | 71.5 | 0.239 | 0.092 | 22.903 | 1.594 | 11.396 | 4.731 |
| | Mixed Feed | 94 | 100.0 | 0.334 | 0.264 | 22.928 | 1.594 | 11.602 | 31.531 |
| 824 | 30% Magnetic | 9.2 | 9.82 | 0.031 | 0.015 | 3.187 | 0.249 | 1.602 | 0.717 |
| 825 | 60% Magnetic | 18.3 | 19.53 | 0.111 | 0.048 | 8.729 | 0.613 | 4.394 | 2.250 |
| 826 | 90% Magnetic | 25.8 | 27.53 | 0.233 | 0.093 | 17.552 | 1.262 | 8.807 | 4.983 |
| 827 | Non-Magnetic | 40.4 | 43.12 | 0.276 | 0.141 | 5.507 | 0.445 | 3.021 | 26.275 |
| | Calculated Mixed Feed | 93.7 | 100.00 | 0.510 | 0.234 | 23.059 | 1.708 | 11.827 | 31.258 |

TABLE 8

| Sample # | Description | Weight grams | Amount wt % | Recovery [%] | | | | | |
|---|---|---|---|---|---|---|---|---|---|
| | | | | Al | Cu | Fe | Li | P | C |
| 822 | Anode: Cu - Carbon | 26.8 | 28.5 | — | — | — | — | — | — |
| 823 | Cathode: Al—LiFePO4 | 67.2 | 71.5 | — | — | — | — | — | — |
| — | Mixed Feed | 94 | 100.0 | 152.72 | 88.88 | 100.57 | 107.13 | 101.94 | 99.13 |
| 824 | 30% Magnetic | 9.2 | 9.82 | 9.30 | 5.78 | 13.90 | 15.59 | 13.80 | 2.28 |
| 825 | 60% Magnetic | 18.3 | 19.53 | 33.25 | 18.06 | 38.07 | 38.48 | 37.87 | 7.14 |
| 826 | 90% Magnetic | 25.8 | 27.53 | 69.89 | 35.32 | 76.55 | 79.19 | 75.90 | 15.80 |
| 827 | Non-Magnetic | 40.4 | 43.12 | 82.83 | 53.56 | 24.02 | 27.94 | 26.04 | 83.33 |
| — | Calculated Mixed Feed | 93.7 | 100.00 | 100.00 | 100.00 | 100.00 | 100.00 | 100.00 | 100.00 |
| — | 30% Magnetic | — | — | 6.09 | 6.50 | 13.82 | 14.55 | 13.54 | 2.30 |
| — | 60% Magnetic | — | — | 21.77 | 20.31 | 37.85 | 35.92 | 37.15 | 7.20 |
| — | 90% Magnetic | — | — | 45.77 | 39.74 | 76.12 | 73.92 | 74.46 | 15.94 |
| — | Non-Magnetic | — | — | 54.23 | 60.26 | 23.88 | 26.08 | 25.54 | 84.06 |

The first pass at 30% field intensity (approximately 0.6 Tesla) retained 9.82 weight percent of the slurry solids, the second pass at 60% field intensity (approximately 1.2 Tesla) retained 19.53 weight percent of the slurry solids, the third pass at 90% field intensity (approximately 1.8 Tesla) retained 27.53 weight percent of the slurry solids, and the remaining 43.12 weight percent was collected as the non-magnetic fraction. The graphite carbon anode active material was separated from the cathode active material in the non-magnetic fraction with a recovery of 83% at a concentration of 65 weight percent. The lithium iron phosphate cathode active material was separated from the anode active material in the 90% magnetic fraction with a recovery of 75% at a concentration of 17% based on mass of phosphorus. Analogous recovery and concentration percentages were also observed based on the masses of lithium and iron.

Example-4: Lithium-Ion Electrochemical Cell Recycle Processes

Figure 26:
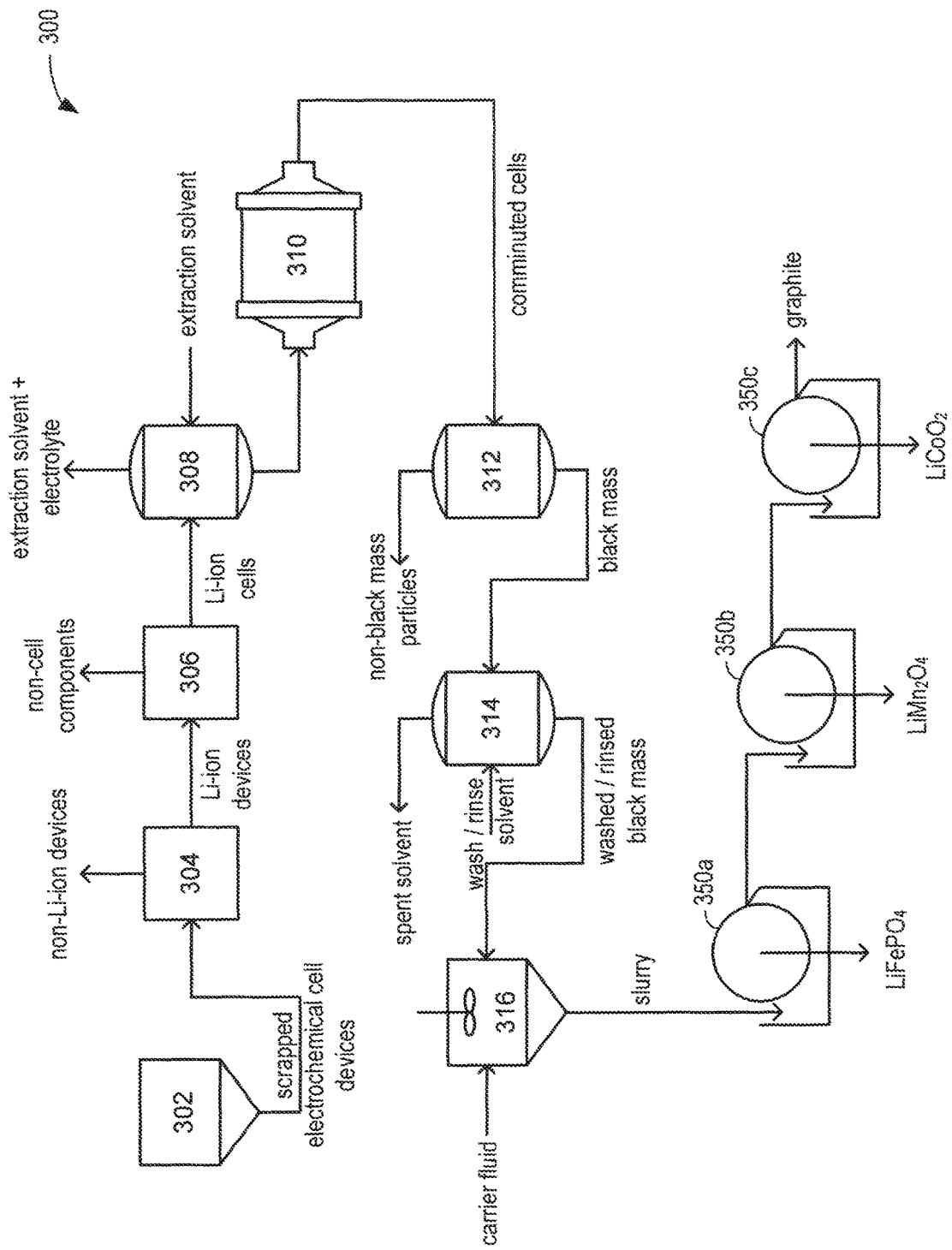
FIGS. 26 and 27 are process and system flow diagrams illustrating exemplary lithium-ion electrochemical cell recycle processes and systems.

An exemplary lithium-ion electrochemical cell recycle process and system 300 is shown in FIG. 26. Scrapped electrochemical cell devices are collected in storage bin 302. The collected devices are sorted into lithium-ion devices and non-lithium-ion devices (e.g., devices comprising lead-acid and nickel metal hydride chemistries) in unit operation 304. The pre-sorted lithium-ion devices are dissembled in unit operation 306 into lithium-ion cells and non-cell components. The lithium-ion cells are penetrated with an extraction solvent, such as supercritical carbon dioxide, for example, in extraction operation 308. The extraction removes lithium-ion electrolyte from the cells. The extracted cells are comminuted into particles in comminuting operation 310 (e.g., one or more of a knife mill, slitter mill, ball mill, pebble mill, and the like). The comminuted cells are classified in classification operation 312 (e.g., one or more sieving/screening unit operations). The classification operation 312 separates anode and cathode materials into a black mass comprising graphite, $LiFePO_4$, $LiMn_2O_4$, and $LiCoO_2$. The black mass is washed and/or rinsed with a wash and/or rinse solvent in unit operation 314.

Figure 27:
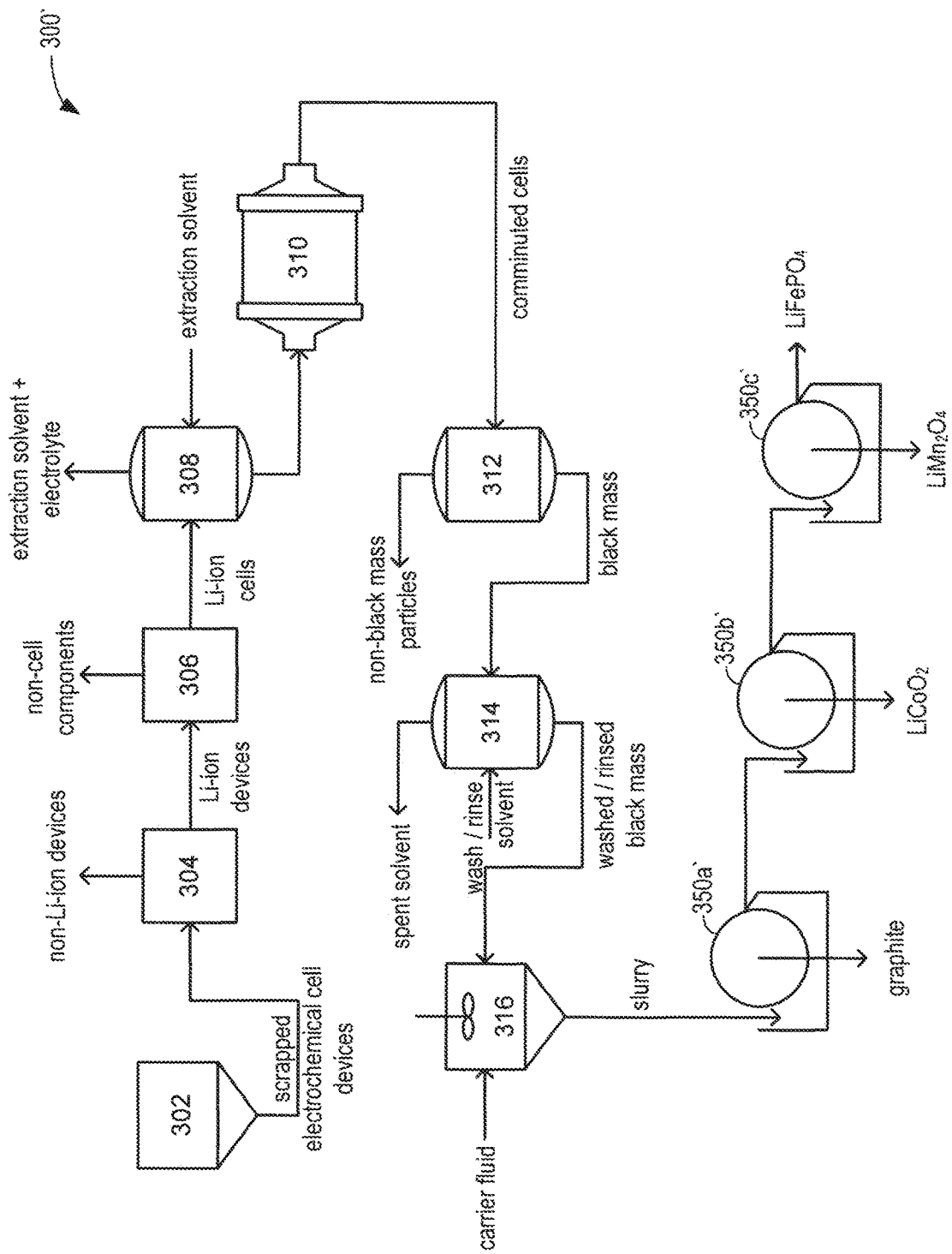

The washed and/or rinsed black mass is mixed with a carrier fluid in unit operation 316 to produce a slurry. The slurry is fed to a first drum separator 350*a* where the most magnetically susceptible electrode active material ($LiFePO_4$) is separated and concentrated in a magnetic fraction. The non-magnetic fraction from the first drum separator 350*a* (comprising graphite, $LiMn_2O_4$, and $LiCoO_2$) is fed to a second drum separator 350*b* operating at a higher magnetic field intensity than the first drum separator 350*a*. The second most magnetically susceptible electrode active material ($LiMn_2O_4$) is separated and concentrated in a magnetic fraction in the second drum separator 350*b*. The non-magnetic fraction from the second drum separator 350*b* (comprising graphite and $LiCoO_2$) is fed to a third drum separator 350*c* operating at a higher magnetic field intensity than the first drum separator 350*a* and the second drum separator 350*b*. The third most magnetically susceptible electrode active material ($LiCoO_2$) is separated and concentrated in a magnetic fraction in the third drum separator 350*c*, and the non-magnetic graphite is separated and concentrated in a non-magnetic fraction in the third drum separator 350*c*. Accordingly, the three drum separators operate in the manner described in connection with FIG. 8. FIG. 27 illustrates an analogous process and system 300' that operates in the manner described in connection with FIG. 9 (i.e., with decreasing magnetic field intensities in succeeding magnetic separation operations).

Figure 28:
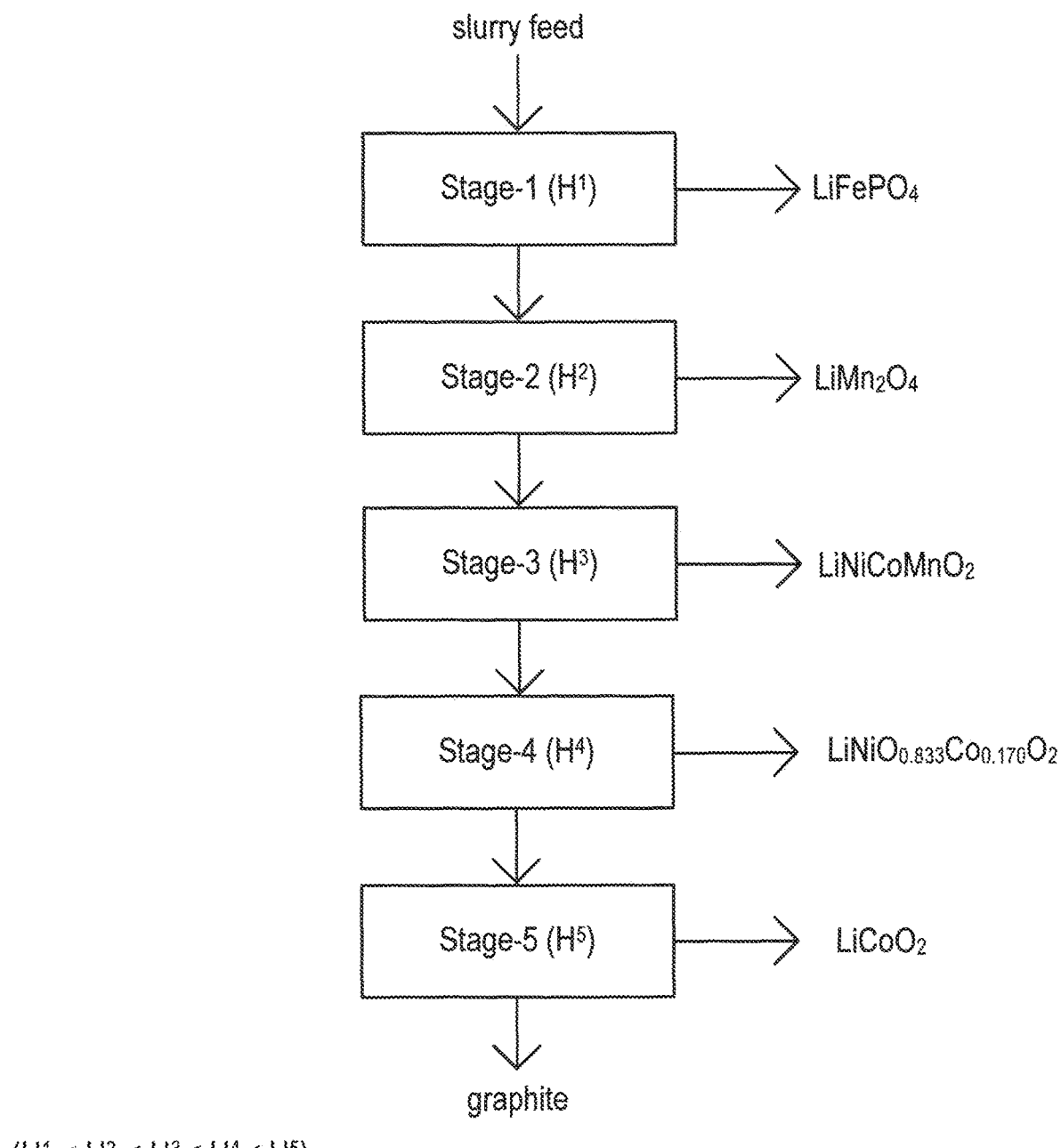
FIG. 28 is a flowchart diagram illustrating a staged magnetic separation of electrode active materials utilizing increasing magnetic field intensities.
Figure 29:
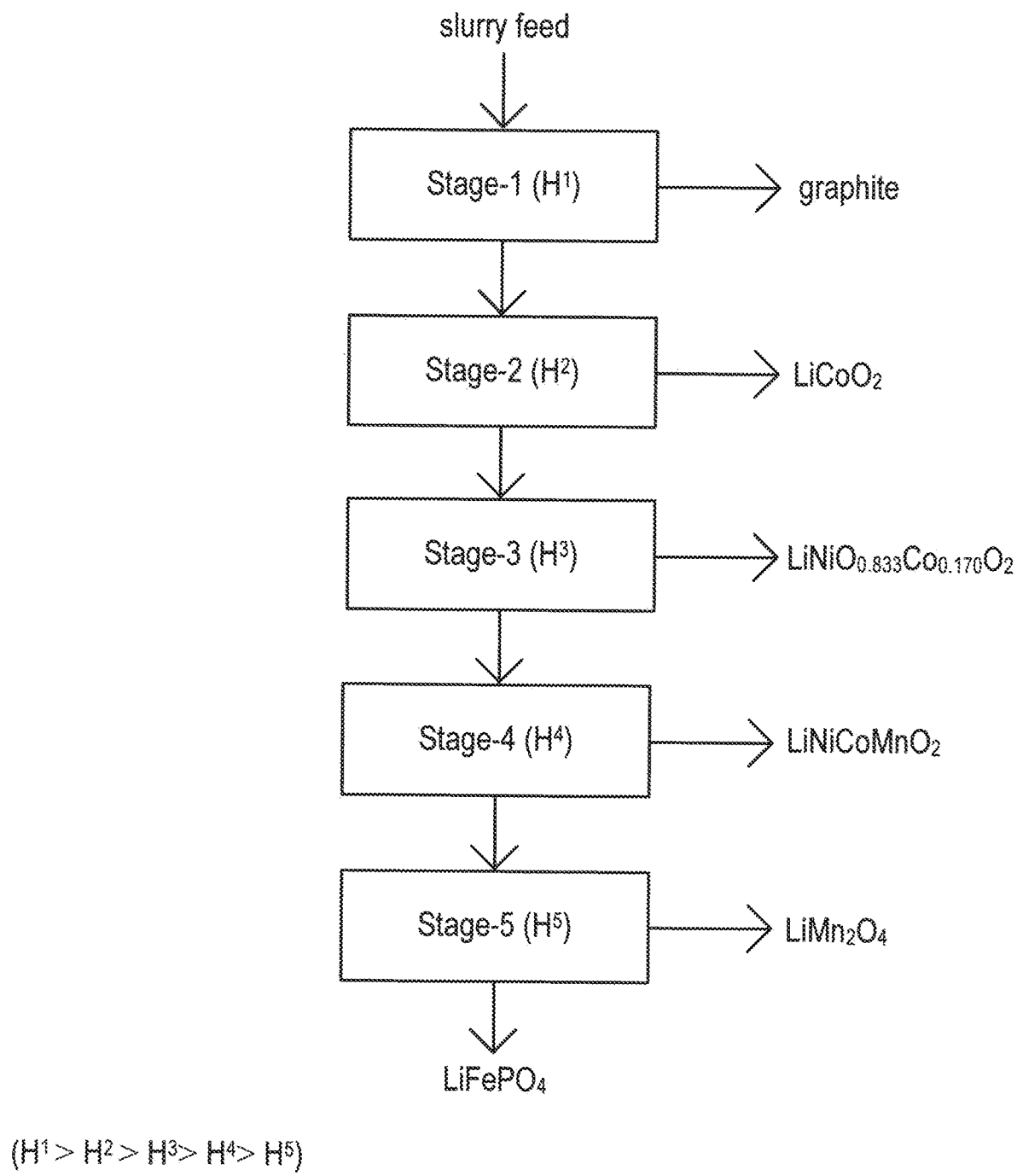
FIG. 29 is a flowchart diagram illustrating a staged magnetic separation of electrode active materials utilizing decreasing magnetic field intensities.

The graphite, $LiFePO_4$, $LiMn_2O_4$, and $LiCoO_2$ concentrates produced in process and system 300 and 300' may be used to manufacture new lithium-ion electrochemical cell devices. The process and system 300 and 300' may also be modified, for example, to comprise high-intensity magnetic filters, wet high-intensity magnetic separators, or like magnetic separation equipment. Additional magnetic separation stages may be incorporated into the process and system as illustrated in FIG. 28 (increased magnetic field intensities in successive stages) and FIG. 29 (decreased magnetic field intensities in successive stages), for example. The process and system 300 and 300' may also be modified, for example, to comprise various additional unit operations as described above, such as, for example, electrical discharge operations (e.g., resistive loading or soaking in an aqueous or non-aqueous salt solution); a preliminary magnetic separation operation to remove ferromagnetic and very highly paramagnetic materials such as, for example, steel casing and housing materials; milling of black mass particles after liberation from other electrochemical cell components; a pyrolysis or heat treatment of black mass before slurry formation; a froth floatation treatment to remove lead and lead compounds from the black mass; a froth floatation treatment to remove diamagnetic materials from the final non-magnetic fraction of the staged magnetic separations; and an ultrasonic dispersion operation to break-up particle agglomerates and further refine the particle size when forming black mass slurry.

Example-5: Mixed Secondary Battery Recycle Process

Figure 30:
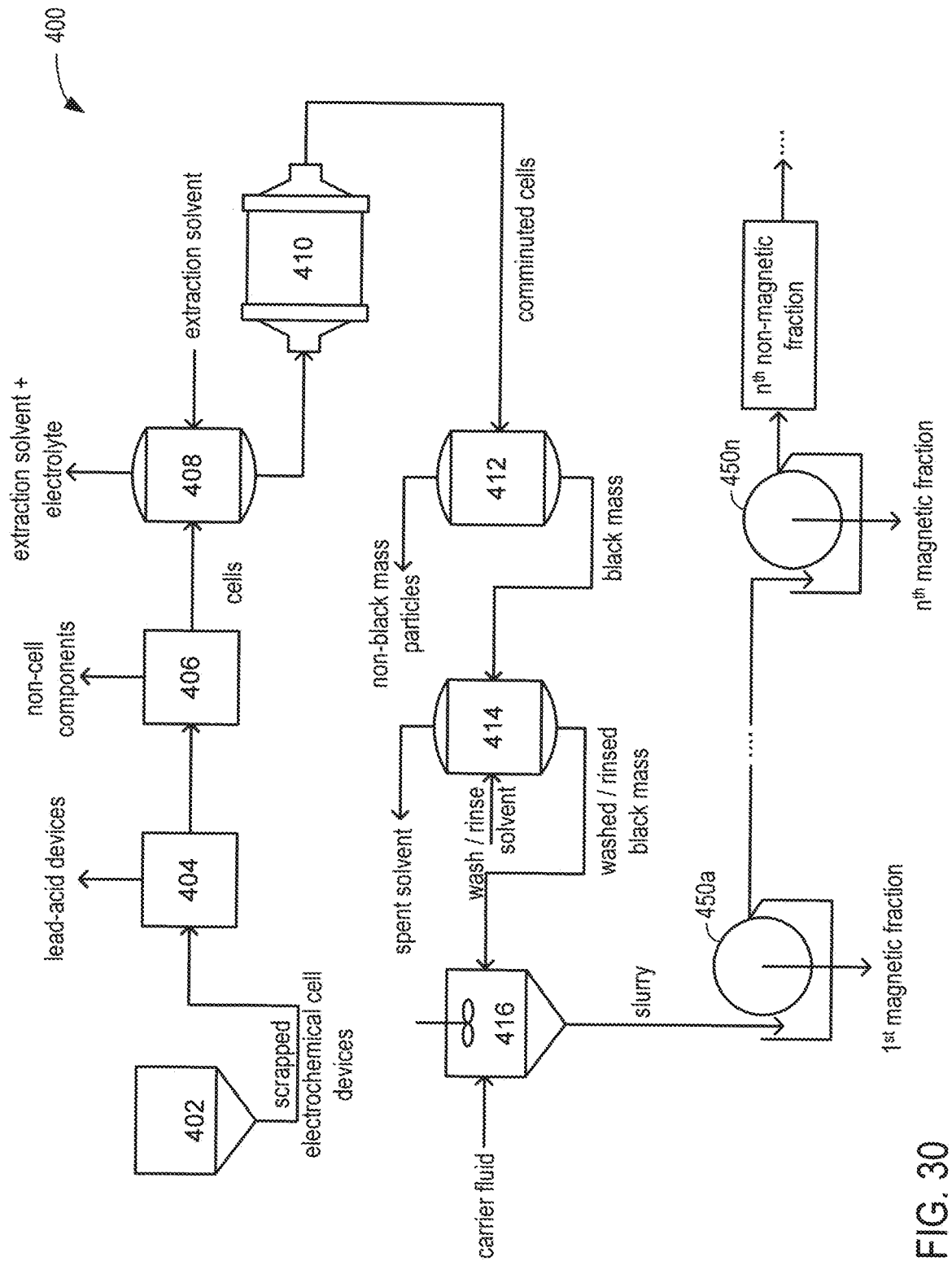
FIG. 30 is a process and system flow diagram illustrating an exemplary mixed electrochemical cell recycle process and system.

An exemplary mixed electrochemical cell recycle process and system 400 is shown in FIG. 30. Scrapped electrochemical cell devices are collected in storage bin 402. The collected devices are sorted into lead-acid devices and non-lead-acid devices in unit operation 404. The pre-sorted no-lead-acid devices are dissembled in unit operation 406 into electrochemical cells and non-cell components. The electrochemical cells are penetrated with an extraction solvent, such as supercritical carbon dioxide, for example, in extraction operation 408. The extraction removes electrolyte from the cells. The extracted cells are comminuted into particles in comminuting operation 410 (e.g., one or more of a knife mill, slitter mill, ball mill, pebble mill, and the like). The comminuted cells are classified in classification operation 412 (e.g., one or more sieving/screening unit operations). The classification operation 412 isolates anode and cathode materials into a black mass comprising graphite, lithium metal compounds, nickel metal hydride alloys, nickel oxyhydroxide, and/or various other electrode active materials. The black mass is washed and/or rinsed with a wash and/or rinse solvent in unit operation 414.

The washed and/or rinsed black mass is mixed with a carrier fluid in unit operation 416 to produce a slurry. The slurry is fed to a first drum separator 450*a* where the most magnetically susceptible electrode active material is separated and concentrated in a first magnetic fraction. A number of staged magnetic separations are conducted in which the non-magnetic fraction of the preceding stage is fed as a slurry to the succeeding stage. In the final ($n^{th}$) stage, a final ($n^{th}$) magnetic fraction is separated from a final ($n^{th}$) non-magnetic fraction in final drum separator 450*n*. The multiple drum separators operate in the manner described in connection with FIGS. 8 and 28 (i.e., with increasing magnetic field intensities in succeeding magnetic separation operations), but may also be operated in the manner described in connection with FIGS. 9 and 29 (i.e., with decreasing magnetic field intensities in succeeding magnetic separation operations). The $1^{st}$ through the $n^{th}$ magnetic fractions may comprise electrode active material concentrates. The $n^{th}$ non-magnetic fraction may be further processed to separate diamagnetic constituents such as, for example, graphite, zinc, cadmium, copper, lead, and related compounds. The separation of these diamagnetic materials may be performed, for example, using a froth flotation operation as described in U.S. Patent Application Publication No. 2011-0272331 A1, which is incorporated by reference into this specification.

The electrode active material concentrates produced in process and system 400 may be used to manufacture new electrochemical cell devices. The process and system 400 may also be modified, for example, to comprise high-intensity magnetic filters, wet high-intensity magnetic separators, or like magnetic separation equipment. The process and system 400 may also be modified, for example, to comprise various additional unit operations as described above, such as, for example, electrical discharge operations (e.g., resistive loading or soaking in an aqueous or non-aqueous salt solution, a preliminary magnetic separation operation to remove ferromagnetic and very highly paramagnetic materials such as, for example, steel casing and housing materials, a froth floatation treatment to remove lead and lead compounds from the black mass, and an ultrasonic dispersion operation to break-up particle agglomerates and further refine the particle size when forming black mass slurry.

Using magnetic separation is a relatively inexpensive way to efficiently separate electrode active materials from each other creating a profitable product. In comparison to hydrometallurgy, the cost savings can be found in the fact that the process and systems described in this specification do not require chemical extraction/leachant solutions and precipitation, deposition, or electrowinning operations. In comparison to pyrometallurgy, lower costs are realized by avoiding the use of energy intensive smelting operations to reduce the material to its base metals. In contrast to both hydrometallurgy and pyrometallurgy processes, the processes and systems described in this specification directly produce recycled electrode active material that can be directly re-used in new electrochemical cell manufacturing.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, step sequences, components, elements, features, aspects, characteristics, limitations, and the like, of the various non-limiting embodiments described in this specification. In this manner, Applicant(s) reserve the right to amend the claims during prosecution to add features as variously described in this specification, and such amendments comply with the requirements of 35 U.S.C. § 112, first paragraph, and 35 U.S.C. § 132(a).

What is claimed is:

1. A process, comprising:
    forming a slurry comprising electrode active material particles comprising paramagnetic particles of one or more lithium-ion electrochemical cells;
    magnetizing the electrode active material particles;
    separating the magnetized electrode active material particles from the slurry; and
    separating the electrode active material particles into at least two lithium metal compounds.

2. The process of claim 1, wherein forming the slurry comprises one of the following:
    suspending the electrode active material particles in a fluid; and
    dispersing the electrode active material particles in the fluid.

3. The process of claim 1, wherein magnetizing the electrode active material particles comprises subjecting the slurry to a magnetic field.

4. The process of claim 3, wherein subjecting the slurry to the magnetic field comprises passing the slurry through a magnetic filter.

5. The process of claim 3, wherein subjecting the slurry to the magnetic field comprises passing the slurry through a magnetic separator.

6. The process of claim 1, wherein separating the magnetized active electrode particles from the slurry comprises inducing a magnetic force between the magnetized electrode active material particles and an active magnetic surface in contact with the slurry.

7. The process of claim 1, wherein separating the magnetized active electrode particles from the slurry comprises pinning the magnetized active electrode particles to an active magnetic surface which is in contact with the slurry.

8. The process of claim 1, wherein separating the magnetized active electrode particles from the slurry comprises:
    inducing a magnetic force between the magnetized electrode active material particles and a magnetic flux converging matrix in contact with the slurry; and
    pinning the magnetized active electrode particles to the magnetic flux converging matrix.

9. The process of claim 1, wherein separating the magnetized active electrode particles from the slurry comprises separating the magnetized active electrode particles from an active magnetic surface.

10. The process of claim 1, further comprising forming a lithium metal compound concentrate from the separated magnetized electrode active material particles.

11. The process of claim 1, further comprising, before forming the slurry:
    comminuting the one or more lithium-ion electrochemical cells; and
    separating the electrode active material particles from other components of the one or more lithium-ion electrochemical cells.

12. A process, comprising:
    flowing a slurry comprising electrode active material particles comprising paramagnetic particles of one or more electrochemical cells;
    magnetizing the electrode active material particles;
    separating the magnetized electrode active material particles from the slurry, wherein the separated magnetized electrode active material particles comprise at least two lithium metal compounds; and
    separating the electrode active material particles into at least two lithium metal compounds.

13. The process of claim 12, wherein flowing the slurry comprises flowing the slurry through at least one of the following:
a magnetic filter;
a magnetic separator; and
a drum separator.

14. The process of claim 12, wherein magnetizing the electrode active material particles comprises subjecting the slurry to a magnetic field.

15. The process of claim 12, wherein separating the magnetized electrode active material particles from the slurry comprises:
inducing a magnetic force between the magnetized electrode active material particles and an active magnetic surface in contact with the slurry; and
pinning the magnetized active electrode particles to the active magnetic surface.

16. The process of claim 12, further comprising forming a lithium compound concentrate from the separated magnetized electrode active material particles.

17. A process, comprising:
flowing a slurry comprising multiple electrode active materials through a series of magnetic separation stages;
separating paramagnetic particles of the slurry from graphite particles of the slurry; and
applying magnetic fields of different intensities to the slurry to separate first of the paramagnetic particles from second of the paramagnetic particles, wherein at least one of the first and second paramagnetic particles comprise a lithium metal compound.

18. The process of claim 17, wherein separating the paramagnetic particles from the graphite particles comprises magnetizing the paramagnetic particles.

19. The process of claim 17, wherein applying magnetic fields of different intensities comprises applying magnetic fields of successively increasing intensities to the slurry.

20. The process of claim 17, wherein applying magnetic fields of different intensities comprises applying magnetic fields of successively decreasing intensities to the slurry.

* * * * *